US007299185B2

(12) United States Patent
Falcon et al.

(10) Patent No.: US 7,299,185 B2
(45) Date of Patent: *Nov. 20, 2007

(54) SYSTEMS AND METHODS FOR MANAGING INTERACTIONS FROM MULTIPLE SPEECH-ENABLED APPLICATIONS

(75) Inventors: Stephen Russell Falcon, Woodinville, WA (US); Clement Chun Pong Yip, Bellevue, WA (US); Dan Banay, Seattle, WA (US); David Michael Miller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/264,488

(22) Filed: Nov. 1, 2005

(65) Prior Publication Data

US 2006/0069571 A1    Mar. 30, 2006

Related U.S. Application Data

(63) Continuation of application No. 10/067,519, filed on Feb. 4, 2002, now Pat. No. 7,139,713.

(51) Int. Cl.
    *G10L 21/00* (2006.01)
(52) U.S. Cl. .................................................. 704/270
(58) Field of Classification Search ................ 704/270, 704/270.1, 275
    See application file for complete search history.

(56) References Cited

U.S. PATENT DOCUMENTS

| 5,001,697 A | 3/1991 | Torres |
| 5,748,974 A | 5/1998 | Johnson |
| 5,796,401 A | 8/1998 | Winer |
| 5,797,123 A | 8/1998 | Chou et al. |
| 5,838,969 A | 11/1998 | Jacklin et al. |
| 5,842,165 A | 11/1998 | Raman et al. |
| 5,854,629 A | 12/1998 | Redpath |
| 6,058,366 A | 5/2000 | Tarkiainen et al. |
| 6,061,653 A | 5/2000 | Fisher et al. |
| 6,065,041 A | 5/2000 | Lum et al. |
| 6,125,347 A | 9/2000 | Cote et al. |
| 6,192,339 B1 | 2/2001 | Cox |

(Continued)

OTHER PUBLICATIONS

"Winamp 3 Preview". http://www.mp3newswire.net/stories/2001/winamp3.htm. May 23, 2001.

(Continued)

*Primary Examiner*—Angela A. Armstrong
(74) *Attorney, Agent, or Firm*—Lee & Hayes, PLLC

(57) ABSTRACT

Systems and methods are described for speech systems that utilize an interaction manager to manage interactions—also known as dialogues—from one or more applications. The interactions are managed properly even if multiple applications use different grammars. The interaction manager maintains an interaction list. An application wishing to utilize the speech system submits one or more interactions to the interaction manager. Interactions are normally processed in the order in which they are received. An exception to this rule is an interaction that is configured by an application to be processed immediately, which causes the interaction manager to place the interaction at the front of the interaction list of interactions. If an application has designated an interaction to interrupt a currently processing interaction, then the newly submitted application will interrupt any interaction currently being processed and, therefore, it will be processed immediately.

20 Claims, 14 Drawing Sheets

INTERACTION PROCESSING

U.S. PATENT DOCUMENTS

| | | |
|---|---|---|
| 6,233,559 B1 | 5/2001 | Balakrishnan |
| 6,310,629 B1 | 10/2001 | Muthusamy et al. |
| 6,434,529 B1 | 8/2002 | Walker et al. |
| 6,456,305 B1 | 9/2002 | Qureshi et al. |
| 6,456,974 B1 | 9/2002 | Baker et al. |
| 6,463,413 B1 | 10/2002 | Applebaum et al. |
| 6,469,711 B2 | 10/2002 | Foreman et al. |
| 6,507,817 B1 | 1/2003 | Wolfe et al. |
| 6,701,383 B1 | 3/2004 | Wason et al. |
| 6,785,654 B2 | 8/2004 | Cyr et al. |
| 6,975,993 B1 | 12/2005 | Keiller |
| 6,993,508 B1 | 1/2006 | Major et al. |
| 7,188,066 B2 | 3/2007 | Falcon et al. |
| 2002/0024539 A1 | 2/2002 | Eleftheriadis |
| 2002/0095290 A1 | 7/2002 | Kahn et al. |
| 2003/0050777 A1 | 3/2003 | Walker, Jr. |

OTHER PUBLICATIONS

"Skin (computing)". http://en.wikipedia.org/wiki/Skin_%28computing%29. Wikipedia entry.

"Winamp.com Skins". http://www.winamp.com/skins. (Various selections).

"Winamp2: Winamp's Subwindows". http://www.winamp-faq.de/english/wa2/documentation/sub.htm. 2000 DigiTalk.

Sun Microsystems, "Java Speech API Programmer's Guide", Version 1.0, Oct. 1998.

INTERACTION A
200

INTERACTION B
220

INTERACTION C
230

INTERACTION LIST

Front of List (Active)    Back of List

Active

INTERACTION PROCESSING

INTERRUPTION

INTERACTION CHAINING

INTERRUPTION OF CHAINED INTERACTION

INTERRUPTION OF GRACE PERIOD

MASTER GRAMMAR TABLE
800

GRAMMAR TABLE
810

QUESTION CONTROL

QUESTION CONTROL

ANNOUNCER CONTROL

1210 — COMMAND MANAGER OBJECT INTERFACE
  PROPERTIES
  1220 — PERSISTENCE ID
  1222 — GRAMMAR ID
  1224 — GRAMMAR
  METHODS
  1226 — CREATE GRAMMAR
  1228 — PERSIST
  1230 — REMOVE GRAMMAR
  1232 — START
  1234 — EVENT: RECOGNITION

1212 — GRAMMAR OBJECT INTERFACE
  PROPERTIES
  1236 — ENABLED
  METHODS
  1238 — RULE
  1240 — CREATE RULE

1214 — RULE OBJECT INTERFACE
  PROPERTIES
  1242 — ENABLED
  METHODS
  1244 — ADD RULE
  1246 — ADD PHRASE
  1248 — ADD ALTERNATE RULE
  1250 — ADD ALTERNATE PHRASE

1216 — RECOGNITION OBJECT INTERFACE
  PROPERTIES
  1252 — RULE
  1254 — TEXT
  METHODS
  1256 — PROPERTY VALUE
  1258 — GET ALTERNATE

*Fig. 12b*

SYSTEMS AND METHODS FOR MANAGING INTERACTIONS FROM MULTIPLE SPEECH-ENABLED APPLICATIONS

RELATED APPLICATIONS

This patent application claims priority to parent U.S. patent application Ser. No. 10/067,519 to Stephen Falcon, filed Feb. 4, 2002 now U.S. Pat. No. 7,139,713, and entitled, "Systems And Methods For Managing Interactions From Multiple Speech-Enabled Applications."

TECHNICAL FIELD

The systems and methods described herein relate to speech systems and speech-enabled applications that run on speech systems. More particularly, the described invention relates to managing interactions from multiple speech-enabled applications that utilize more than one grammar.

BACKGROUND

Speech systems have been incorporated into many useful applications so that users may utilize the applications without having to manually operate an input device, such as a mouse or a keyboard. Personal computer systems (desktop, laptop, handheld, etc.) and automobile systems are only two examples of systems, or platforms, that may include integrated speech recognition functions.

A single platform may have several applications executing at a given time. For example, in an automobile computer system that utilizes speech recognition software, there may be speech-enabled applications for radio operation, navigational tools, climate controls, mail, etc. Personal computers may include word processors, spreadsheets, databases and/or other programs that utilize speech recognition. Each speech-enabled application has a grammar associated with it that is a set of commands that the application is attempting to detect at any one time.

Different applications may have different grammars. For instance, a word processing speech-enabled application may use a grammar that enables it to detect the command "print." However, an automobile speech-enabled application that controls a car radio would not have such a command. On the other hand, the car radio application may have a grammar that enables the speech system to recognize the command "FM" to set the radio to the FM band. The word processor would not waste overhead by including an "FM" command in its relevant grammar.

As the number of speech-enabled applications and grammars has increased, it has become increasingly problematic to run multiple speech-enabled applications on a single platform. Although each speech-enabled application may have its own unique grammar, certain commands may be used in more than one grammar, e.g., "stop." When a speech system receives such a command, it must be able to determine which application the speaker directed the command to and which application should respond to the user.

Similarly, multiple speech-enabled applications may attempt to deliver speech feedback simultaneously. This can result in a garbled communication that a user cannot understand. Such a result renders one or more of the applications useless. Also, if speech feedback from one speech-enabled application interrupts speech feedback from another similar application, the feedback from one or both applications may not be understandable to a user.

For example, suppose a first application asks a question of the user and awaits a response. But before the user responds to the first application, a second application asks the user a question. Which application will accept the user's first answer? Will one of the applications accept an answer intended for the other application? Will either application be able to function properly with the response(s) it receives? With no control over specific interactions between the system and the user, there is no certain answer to any of these questions.

One method that has been devised to handle this problem is to create a 'token' that indicates which application has the right to execute at any given time. When an application is ready to execute it requests a token. When the application receives the token, the application may execute.

One of several drawbacks of such a system is that applications may crash or hang. If an application that currently holds the token crashes, then the system may not recover unless the system is prepared for application crashes. If the application hangs, then the system may never be able to regain control. Therefore, a token system is an inadequate solution to the problems encountered when attempting to execute multiple speech-enabled applications.

Another problem that is encountered by speech-enabled applications is that when a command is given to an application that is not currently running, the command simply falls on deaf ears, so to speak, and there is no response to the command. Therefore, a user must first manually or vocally launch the application, then speak the desired command for the application. This means that a user must always be aware of which applications are running and which are not, so that the user knows whether she must launch an application before issuing certain commands. For example, if an automobile driver wants to play "song_A.mp3" on a car radio, the driver must first issue a command or manually launch an MP3 player, then command the player to play "song_A." It would be desirable to minimize the actions required to launch an application and subsequently issue a command.

SUMMARY

Systems and methods are described for managing interactions in a speech system that utilizes more than one grammar from more than one speech-enabled application. Multiple speech-enabled applications executing on a platform typically means that the platform must recognize and prioritize different grammars. The invention described herein addresses the problem of managing and prioritizing different grammars on a single platform so that a user can understand the applications and vice-versa.

In one or more implementation, a speech system interaction manager (hereinafter, an "interaction manager") is described. An "interaction" as used herein is defined as a complete exchange between a user and a speech system. The interaction manager manages interactions between multiple speech applications and a user so that (a) it is clear to the user which application the user is speaking to, and (b) it is clear to the applications which application is active.

When an application wishes to utilize a speech system, the application submits an interaction to the interaction manager. The submitted interaction is placed at the end of an interaction list containing interactions to be processed by the speech system. The only time that an interaction is placed anywhere other than at the end of the interaction list is when an application indicates in the interaction that the interaction is to be placed at the top of the interaction list, i.e., the interaction is to be processed immediately. If this is indicated, the interaction is placed at the top of the interaction list. In one implementation, this indication is made by the application designating a particular grammar to be used with the interaction that is configured to be processed immediately. This type of grammar is referred to as a global grammar.

If an interaction is added to the interaction list while another interaction is being processed, then the interaction waits until the current interaction has concluded processing unless the application specifies in the interaction that the interaction is to interrupt any interaction currently being processed. If this is so indicated, then the current interaction is interrupted so that the interrupting interaction can be processed. After the interrupting interaction is processed, the interrupted interaction may be configured to pick up where it left off, start over, re-prompt somewhere in the middle of the interaction, or cancel itself. Interaction processing then proceeds normally.

An application may also indicate that an interaction is not to be added to the interaction list if the interaction list is not empty at the time the interaction is submitted. Such an indication may be used on an interaction that pertains to time-sensitive data that may be stale if it is not processed immediately, but is not of an importance such that it should interrupt another interaction.

The interaction manager keeps applications informed as to the status of interactions belonging to the applications. For example, the interaction manager sends messages to applications, such as an interaction activated message, an interaction interrupted message, an interaction self-destructed message, an interaction re-activated message, and an interaction completed message.

The interaction manager keeps track of the interactions being processed by the speech system so that the speech system only processes one interaction at a time. In this way, the interactions are processed in an orderly manner that allows multiple applications to run concurrently on the speech system, even if the multiple applications each use a different grammar. As a result, a user can better communicate with each of the applications.

BRIEF DESCRIPTION OF THE DRAWINGS

A more complete understanding of exemplary methods and arrangements of the present invention may be had by reference to the following detailed description when taken in conjunction with the accompanying drawings wherein:

FIG. 12b is a representation of a command manager object interface.

DETAILED DESCRIPTION

Figure 1:
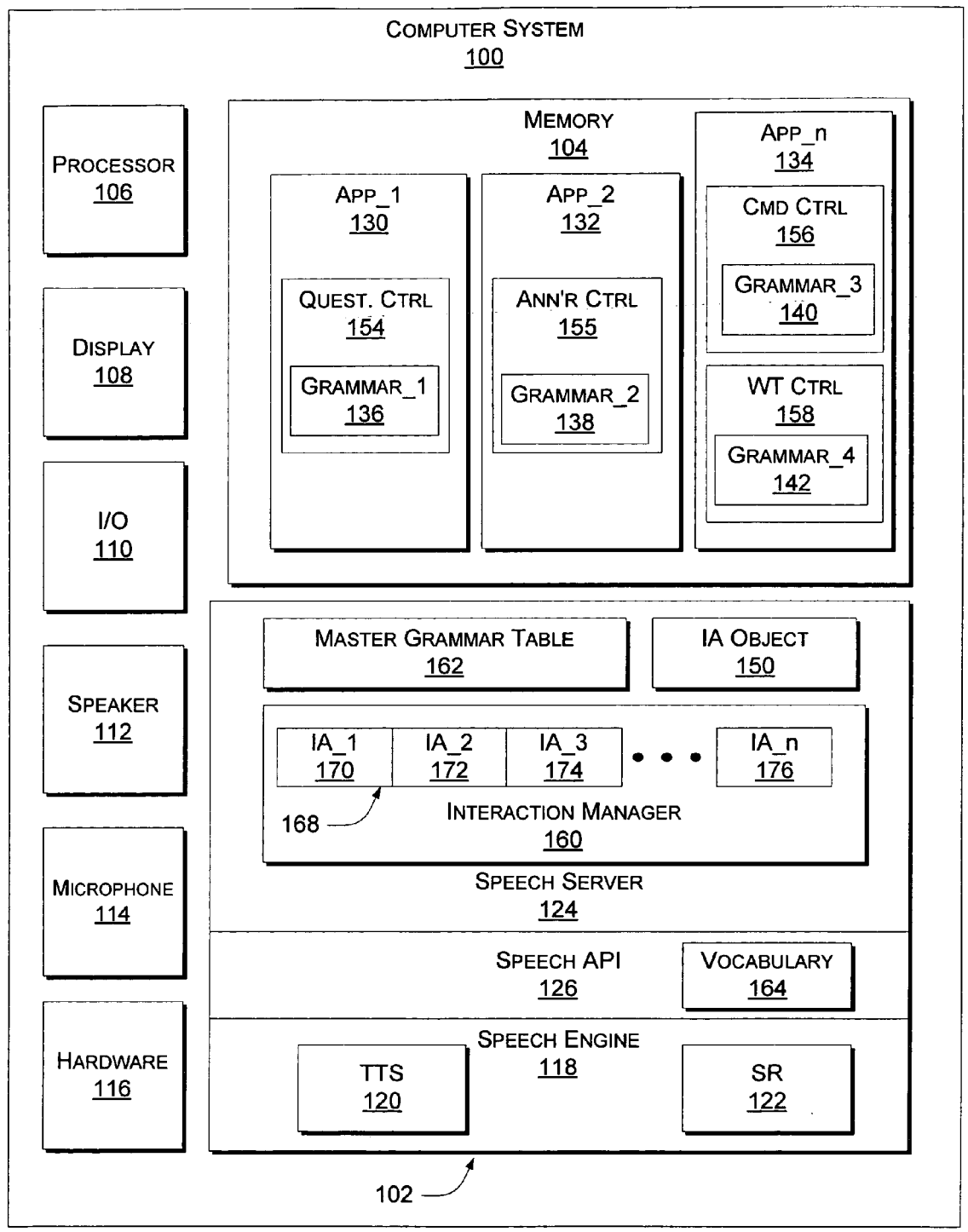
FIG. 1 is a block diagram of a computer system conforming to the invention described herein.

This invention concerns a speech system that is able to manage interactions from multiple speech-enabled applications to facilitate meaningful dialogue between a user and the speech system. This invention speech system may be applied to a continuous speech system as well as a discrete speech system.

Furthermore, the invention may be described herein as an automobile speech system or systems. However, the invention may also be implemented in non-automobile environments. Reference may be made to one or more of such environments. Those skilled in the art will recognize the multitude of environments in which the present invention may be implemented.

General Terms

Following is a brief description of some of the terms used herein. Some of the terms are terms of art, while others are novel and unique to the described invention. Describing the terms initially will provide proper context for the discussion of the invention, although the descriptions are not meant to limit the scope of the terms in the event that one or more of the descriptions conflict with how the terms are used in describing the invention.

Grammars

As previously stated, each speech-enabled application likely has its own specific grammar that a speech system must recognize. There are a variety of different things that applications will want to do with their grammars, such as constructing new grammars, using static grammars, enable/disable rules or entire grammars, persist grammars, make the grammars continually available, etc. The speech system described herein exposes methods to accomplish these things and more.

Different grammars can have different attributes. A static grammar is one that will not change after being loaded and committed. A dynamic grammar, to the contrary, is a grammar that may change after a commit. Whether a grammar is static or dynamic must be known when the grammar is created or registered with the speech system. Rules may also be static or dynamic. A static rule cannot be changed after it is committed, while a dynamic rule may be changed after it is committed. A static rule can include a dynamic rule as a part of the static rule.

A grammar may, at any time, be an enabled grammar or a disabled grammar. A disabled grammar is still within the speech system, but is not being listened for by the system. An enabled grammar may also be called an active grammar; a disabled grammar may also be referred to as an inactive grammar.

Reference is made herein to transient and persistent grammars. A transient grammar is a grammar that is only active while its corresponding application is executing. When the application halts execution, i.e., shuts down, the grammar is removed from the speech system. A persistent grammar is always present in the speech system, whether the application to which the grammar belongs is present in the system. If an utterance is heard that belongs to a persistent grammar and the application is not running to handle it, the speech system launches the application.

Furthermore, reference is made herein to global and yielding grammars. A global grammar contains terms that the speech system is always listening for. Global grammars are used sparingly to avoid confusion between applications. An example of a global grammar is a "call 9-1-1" command. A yielding grammar is active unless another grammar takes focus. The reason that another grammar would take focus is that a conversation unrelated to the grammar becomes active and yielding grammars outside the conversation are disabled.

Interaction

The term "interaction" is used herein to refer to a complete exchange between a speech-enabled application and a user. An interaction is a context of communication that unitizes one or more elements of a dialogue exchange. For example, an application developer may want to program a speech-enabled application to alert a user with a tone, ask the user a question, and await a response from the user. The developer would likely want these three events to occur sequentially, without interruption from another application in order for the sequence to make sense to the user. In other words, the developer would not want the alert tone sounded and the question asked only to be interrupted at that point with a communication from another application. The user may then not know how or when to respond to the question. Therefore, with the present invention, the developer may include the three actions in one interaction that is submitted to a speech system for sequential execution. Only in special circumstances will an interaction be interrupted. Interactions will be discussed in greater detail below.

Conversation

A series of related interactions may be referred to herein as a "conversation." A conversation is intended to execute with minimal interruptions.

Computer-Executable Instructions/Modules

The invention is illustrated in the drawings as being implemented in a suitable computing environment. Although not required, the invention is described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Speech System

FIG. 1 is a block diagram of a computer system 100 that includes a speech system 102 and memory 104. The computer system 100 also includes a processor 106 for executing computer instructions, a display 108, an input/output (I/O) module 110, a speaker 112 for speech output, a microphone 114 for speech input, and miscellaneous hardware 116 typically required in a computer system 100. The computer system 100 may be designed for use in an automobile or in a non-automobile environment, such as in a desktop computer, a handheld computer, an appliance, etc.

The speech system 100 includes a speech engine 118 having a text-to-speech (TTS) converter 120 and a speech recognizer (SR) 122. The TTS converter 120 and the speech recognizer 122 are components typically found in speech systems. The speech recognizer 122 is configured to receive speech input from the microphone 114 and the TTS converter 120 is configured to receive electronic data and convert the data into recognizable speech that is output by the speaker 112.

The speech system 102 also includes a speech server 124 that communicates with the speech engine 118 by way of a speech application programming interface (SAPI) 126. Since the speech engine 118 is separate from the speech server 124, the speech server 124 can operate with any number of vendor-specific speech engines via the speech API 126. However, such a specific configuration is not required.

The SAPI 126 includes a vocabulary 164 that is the entire set of speech commands recognizable by the speech system 102. It is noted that speech engine 118 may include the vocabulary 164 or a copy of the vocabulary 164 that is contained in the SAPI 126. However, the present discussion assumes the vocabulary 164 is included in the SAPI 126.

Several applications may be stored in the memory 104, including application_1 130, application_2 132 and application_n 134. Depending on the components that make up the computer system 100, virtually any practical number of applications may be stored in the memory 104 for execution on the speech server 124. Each application 130-134 is shown including at least one control: Application_1 130 includes a question control 154; application_2 includes an announcer control 156; and application_n includes a command control 156 and a word trainer control 158.

Each control 154-158 uses a specific grammar: the question control 154 uses grammar_1 136; the announcer control 156 uses grammar_2 138; the command control 156 uses grammar_3 152; and the word trainer control 158 uses grammar_4 140.

The controls 154-158 are designed to provide application developers a robust, reliable set of user-interface tools with which to build applications. The controls 154-158 are code modules that perform recurring functions desired by application developers. The controls 154-158 decrease the programming effort required by an original equipment manufacturer or an independent vendor to create a rich application user interface.

The question control 154 gives an application developer an easy way to create various system-initiated interactions, or dialogues. The announcer control 155 provides a developer a simple way to deliver verbal feedback to users, including short notices and long passages of text-to-speech. The command control 156 provides a way for applications to specify what grammar it is interested in listening to, and communicates to the applications if and when a recognition occurs. The word trainer control 158 provides an easy way to implement a speech-oriented word-training interaction with a user. These controls will be discussed in greater detail below.

It is noted that the speech server 126 and the applications 130-134 are separate processes. In most modern operating systems, each process is isolated and protected from other processes. This is to prevent one application from causing another application that is running to crash. A drawback with utilizing separate processes is that it makes sharing data between two processes difficult, which is what the speech server 126 needs to do in this case. Therefore, data must be marshaled between the applications 130-134 and the speech server 126.

There are various ways to marshal data across process boundaries and any of those ways may be used with the present invention. A common way to marshal data is with the use of a proxy and a stub object. A proxy resides in the application process space. As far as the proxy is concerned, the stub object is the remote object it calls. When an application calls some method on a proxy object, it does so internally, which is necessary to package data passed by the application. into the speech server process space, the stub object receives the data and calls a target object in the speech server. However, it is noted that any method known in the art to marshal data between processes may be used.

The speech server 124 also includes an interaction manager 160 and a master grammar table 164. The master grammar table 162 contains one or more grammars that are registered with the speech server 124 by one or more applications. The master grammar table 162 and the registration of grammars will be discussed in greater detail below, with reference to FIG. 3.

The interaction manager 160 maintains an interaction list 168 of one or more interactions (interaction_1 170, interaction_2 172, interaction_3 174, interaction_n 176) from one or more applications in a particular order for processing by the speech server 124. As previously discussed, an interaction is a logical context used by an application to communicate with a user. At any given time, there can be, at most, one active interaction between the user and an application. The interaction manager 160 processes the interactions 170-176 in order. Interactions can be inserted at the front of the interaction list 168, i.e., before interaction_1 170, or at the end of the interaction list 168, i.e., interaction_n. If an interaction is inserted at the front of the interaction list 168, the processing of interaction_1 170 will be interrupted. In one implementation, the interrupting interaction will only interrupt a current interaction if the interrupting interaction is configured to take precedence over a currently executing interaction.

The interaction manager 160 is also configured to notify the applications 170-176 of the following transitions so that the applications 170-176 may modify the state or content of an interaction as it is processed in the interaction list 168: interaction activated, interaction interrupted, interaction self-destructed, interaction re-activated, and interaction completed. As a result, the applications 170-176 can be aware of the state of the speech system 102 at all times.

As previously noted, an interaction contains one or more elements that represent a "turn" of communication. A turn is a single action taken by either the system of the user during an interaction. For example, the system may announce "Fast or scenic route?" during a turn. In response, the user may answer "Fast," which is the user's turn.

Exemplary Interactions

Figure 2A:
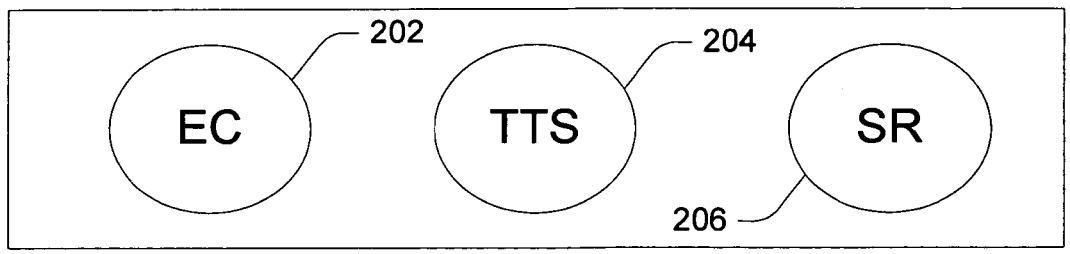
FIG. 2a is a diagram of an exemplary interaction.

FIG. 2 illustrates some examples of interactions. FIG. 2a depicts exemplary interaction_A 200. Interaction_A 200, when executed, will sound a tone, ask a question and await a response from a user. Interaction_A 200 includes three elements that each represent a turn of communication; the first turn is the tone, the second turn is the question, and the third turn is the waiting. The first element is an EC (earcon) 210, which causes an audio file to be played. In this example, the EC 210 sounds a tone to alert a user that the speech system 102 is about to ask the user a question. The second element is a TTS (text-to-speech) 212 element that plays a text file (i.e., speaks), which in this example, asks the user a question. The last element is an SR (speech recognition) 214 element that listens for a term included in the vocabulary 164, FIG. 1. Processing exemplary interaction_A 200 creates the desired result from the speech system 102.

Figure 2B:
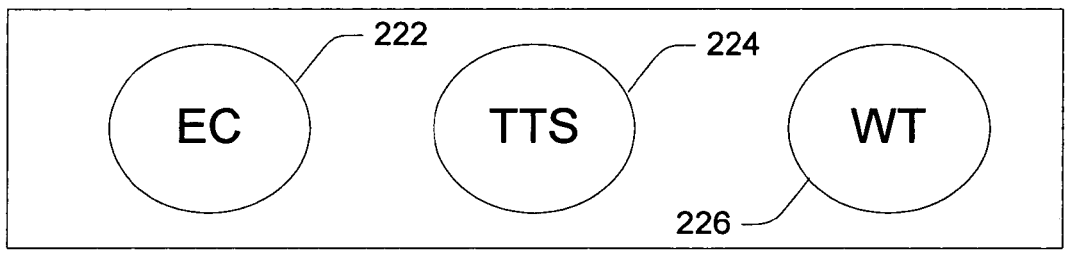
FIG. 2b is a diagram of an exemplary interaction.

FIG. 2b depicts exemplary interaction_B 220 that also includes three elements: an EC 222, a TTS 224 and a WT (word trainer) 226 element. Processing interaction_B 226 results in the speech system sounding a tone, asking the user to state a command, and assigns the response stated by the user to a command.

Figure 2C:
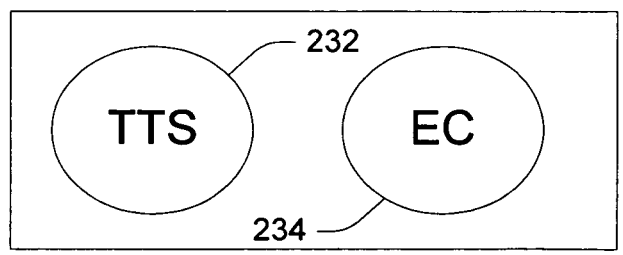
FIG. 2c is a diagram of an exemplary interaction.

FIG. 2c depicts exemplary interaction_C 230 that includes two elements: a TTS 232 and an EC 234. Processing interaction_C 230 results in the speech system 102 playing a text file followed by the playing of an audio file.

There is another type of element (not shown) that may be inserted into an interaction to cause a delay, or time out, before the system processes subsequent elements. This type of element is referred to as a NULL element. A NULL element would be inserted into an interaction to allow additional time for the interaction to be processed.

Referring now back to FIG. 1, the interaction manager 160 provides for the ordering of interactions, including the elements (EC, TTS, WT, NULL, SR) discussed above. This prevents more than one application from addressing the user simultaneously. The interaction manager 160 processes the interactions 170-176 in the interaction list 168 in the order in which the interactions are submitted to the interaction manager 160 (i.e., on a first-in-first-out basis). An exception to this is that an application is provided the ability to submit an interaction directly to the beginning of the interaction list 168 in situations where the application considers the interaction a high priority.

Interaction Management: Methodological Implementation

Figure 3:
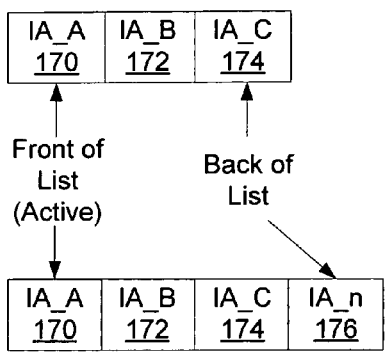
FIG. 3 is a flow diagram depicting a methodological implementation of interaction processing.
Figure 3:
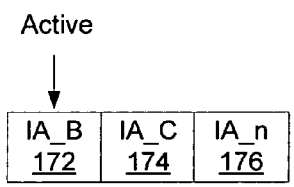
Figure 3:
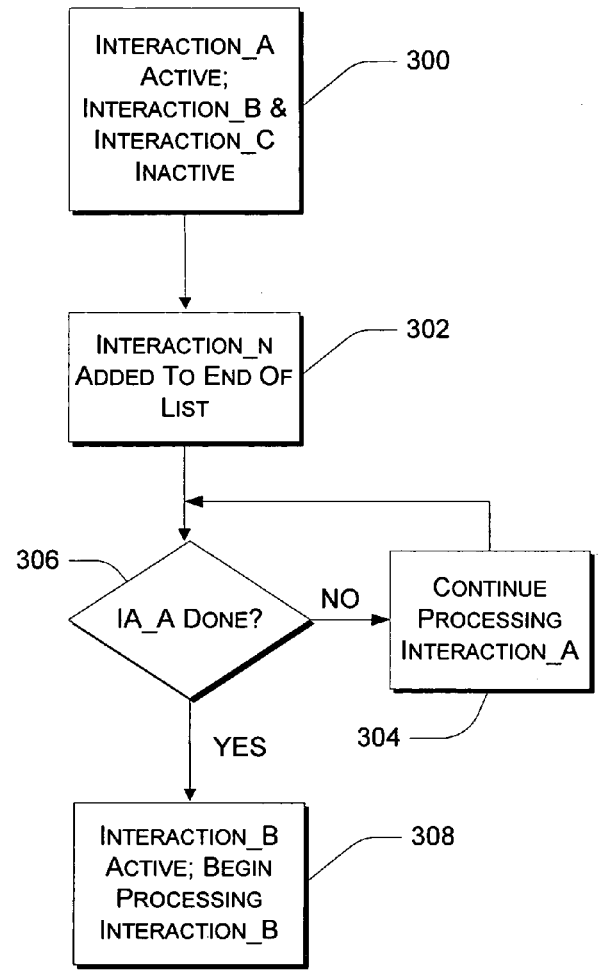

FIG. 3 is a flow diagram depicting a way in which the interaction manager 168 functions to manage the interactions 170-176 in the interaction list 168. In the discussion of FIG. 3 and the following figures, continuing reference will be made to the features and reference numerals contained in FIG. 1.

At block 300, interaction_A 170 is active, while interaction_B 172 and interaction_C 174 wait in the interaction list 168 to be processed. At block 302, interaction_n 176 is added to the end of the interaction list 168. Interaction_A 170 continues processing at block 304 ("No" branch, block 306) until it concludes. Then, interaction_B 172 becomes active, i.e., begins processing at block 308 ("Yes" branch, block 306).

Interruption occurs when an application places an interaction at the beginning of the interaction list 168 without regard to an interaction already active there. When an interruption occurs, the active interaction is deactivated, and the interrupting interaction is activated.

Interaction Interruption: Methodological Implementation

Figure 4:
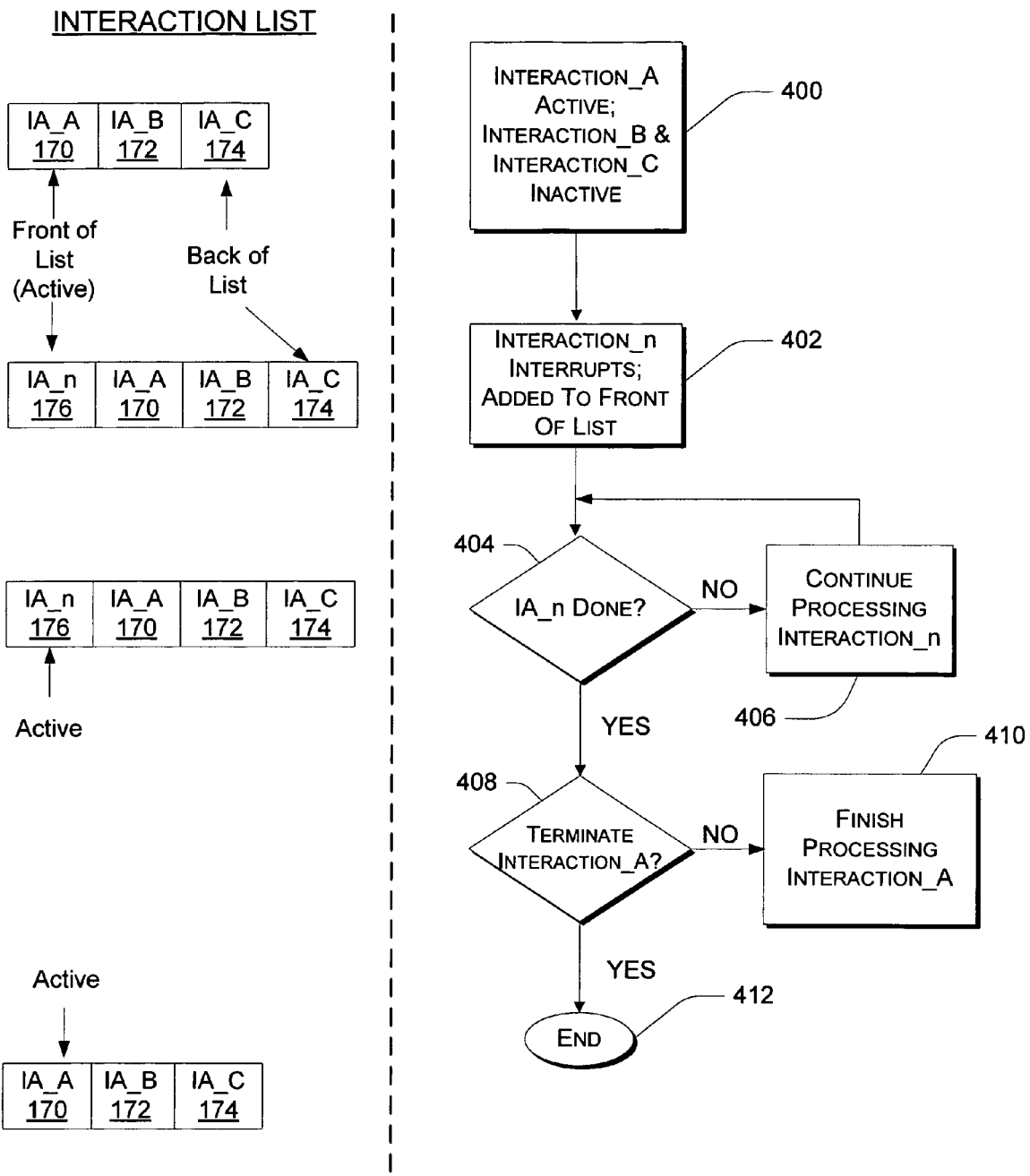
FIG. 4 is a flow diagram depicting a methodological implementation of interaction interruption.

FIG. 4 is a flow diagram depicting an interaction interruption. On the left side of the figure, a current state of the interaction list 168 is shown corresponding to the blocks contained in the flow diagram. At block 400, interaction_A 170 is active while interaction_B 172 and interaction_C 174 are inactive and waiting in the interaction list 168 to be processed. While interaction_A 170 is executing, interaction_n 176 is submitted by one of the speech-enabled applications 130-134 (block 402). The submitting application wants interaction_n 176 to be processed immediately without regard to other interactions in the interaction list 168, so an interruption flag is set in interaction_n 176 that tells the interaction manager 160 to process interaction_n 176 right away.

Interaction_n 176 is then processed at block 406 ("No" branch, block 404) until it has completed, i.e., actions related to any and all elements contained in interaction_n 176 have been performed. Only when interaction_n 176 has completed processing ("Yes" branch, block 404), does interaction_A 170 have the capability to process again.

However, interactions submitted to the interaction list 168 have a self-destruct option that, when used, terminates the interaction in the event that the interaction is interrupted. In some cases, an interaction may need to self-destruct due to internal failure. In such cases, the situation is treated the same as a normal self-destruction.

At block 408, it is determined whether interaction_A 170 has set a self-destruct flag that indicates the interaction should self-destruct upon interruption. If the self-destruct flag (not shown) is set ("Yes" branch, block 408), interaction_A 170 terminates (block 410). If the self-destruction flag is not set ("No" branch, block 408), then interaction_A 170 finishes processing at block 412.

Interactions do not have an inherent "priority." The applications only have an absolute ability to place an interaction at the front of the interaction list 168. Such a placement results in interruption of a current interaction being processed.

In another implementation, not shown, an interrupting interaction will not be processed until a current interaction has concluded if the current interaction will conclude in a pre-determined period of time. If the current interaction will take a longer amount of time than the pre-determined time to conclude, it is interrupted as described above.

For example, suppose that an interrupting interaction will only interrupt a current interaction if the current interaction will not complete within three seconds. If a driver is just completing a long interaction that has taken thirty seconds to process but will conclude in two seconds, it may be desirable to let the interaction finish before interrupting with, say, an engine overheating announcement. If the current interaction is not self-destructing, the driver may have to endure another thirty-two seconds of interaction that he doesn't want to hear if the current interaction is repeated after the overheating announcement concludes. This would become even more irritable if another engine overheating announcement interrupted the current interaction again and the current interaction repeated again.

Interaction Chaining: Methodological Interaction

Interactions may also be "chained" together by speech-enabled applications using the speech server 124. An application may want a certain interaction to establish a chain of interactions that constitutes a conversation. When this is the case, when an interaction concludes processing, the speech server 124 will wait a pre-determined grace period, or time out, before processing the next interaction in the interaction list 168. During the grace period, the application may submit a subsequent interaction.

An example of when interaction chaining may be used is when an automobile navigation system queries a driver for a destination. The navigation application may submit an interaction that asks for a destination state. If the state is submitted, the application may then submit an interaction that asks for a destination city. If the driver submits the city, the application may then submit an interaction that asks for the destination address.

It is easy to understand why a navigation application would not want these interactions broken up. If the interactions are separated, the driver or the speech system 124 may become confused as to where the other is in the dialogue.

Figure 5:
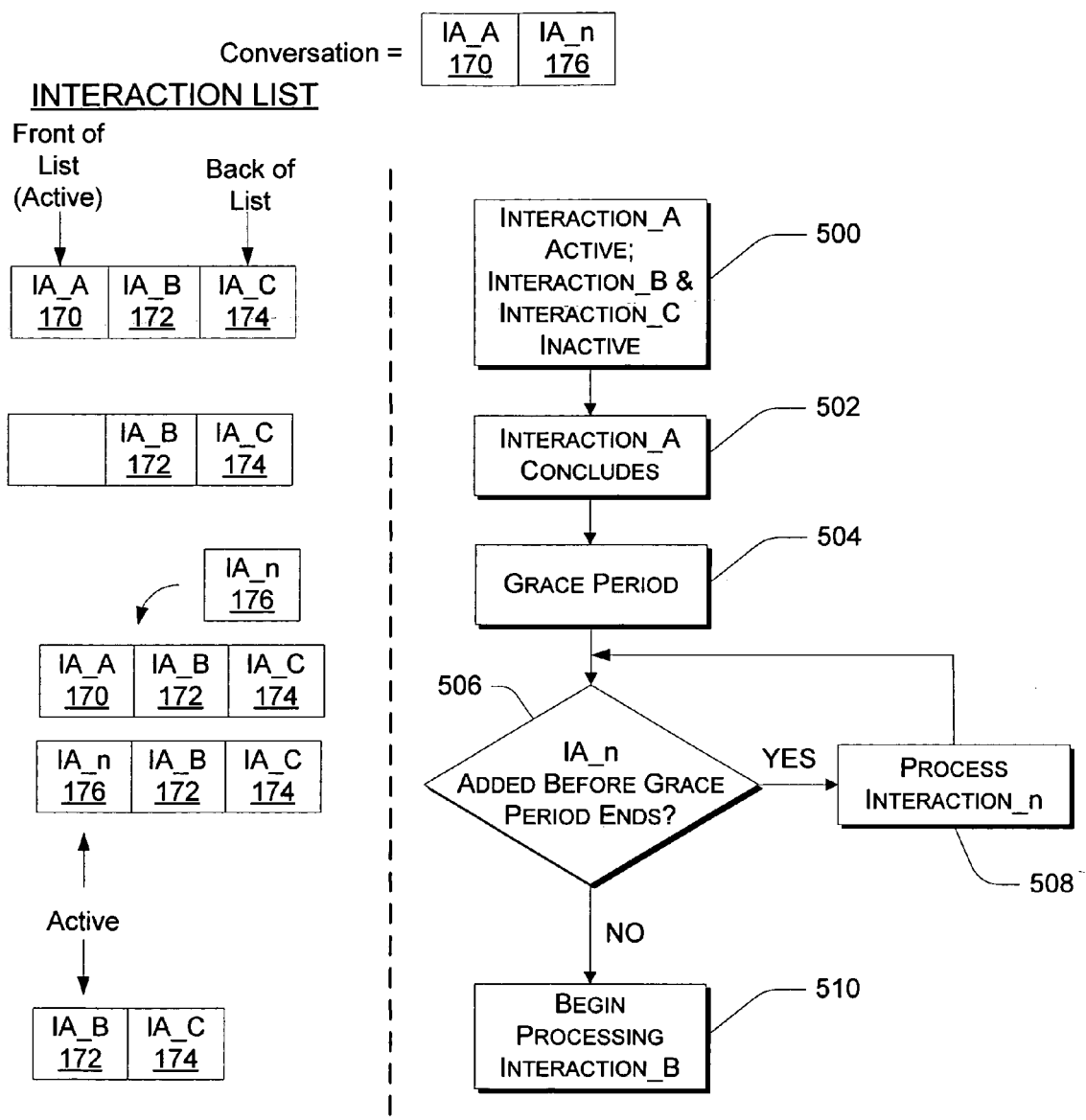
FIG. 5 is a flow diagram depicting a methodological implementation of interaction chaining.

FIG. 5 is a flow diagram depicting the methodology of interaction chaining. Similar to FIG. 4, a current state of the interaction list 168 is shown at each stage of the flow diagram. It is noted that, for this example, one of the applications 130-134 submits a conversation to be processed. The conversation consists of interaction_A 170 and interaction_n 176.

At block 500, interaction_A 170 is active while interaction_B 172 and interaction_C 174 are inactive and waiting in the interaction list 168 to be processed. After interaction_A 170 concludes processing at block 502, the interaction manager 160 waits for the pre-determined grace period before moving on to processing interaction_B 172 (block 504).

At block 506, the application that submitted interaction_A 170 submits interaction_n 176 to be processed to complete the conversation. The submission of interaction_n 176 occurs before the grace period has expired. If interaction_n 176 is not submitted before the grace period expires, interaction_B 172 will begin processing.

When interaction_n 176 is submitted before the grace period expires ("Yes" branch, block 506), interaction_n 176 is processed immediately at block 508. There are no additional interactions to be processed after interaction_n 176 has completed processing ("No" branch, block 506), so interaction_B 172 begins processing at block 510. The desired result is achieved, because the complete conversation (interaction_A 170 and interaction_n 176) was processed without separating the interactions.

Although it is not typically desired, chained interactions may be interrupted by another application. If an application submits an interaction that is flagged to be processed immediately, that interaction will be placed at the front of the interaction list 168, even if doing so will interrupt a conversation. This is one reason that use of the 'process immediately' option should be used sparingly by applications. An example of when the 'process immediately' option may be used is when an automobile engine is overheating. It is probably desirable to interrupt any interactions being processed to tell the driver of the situation since the situation requires immediate attention.

Chained Interaction Interruption: Methodological Implementation

Figure 6:
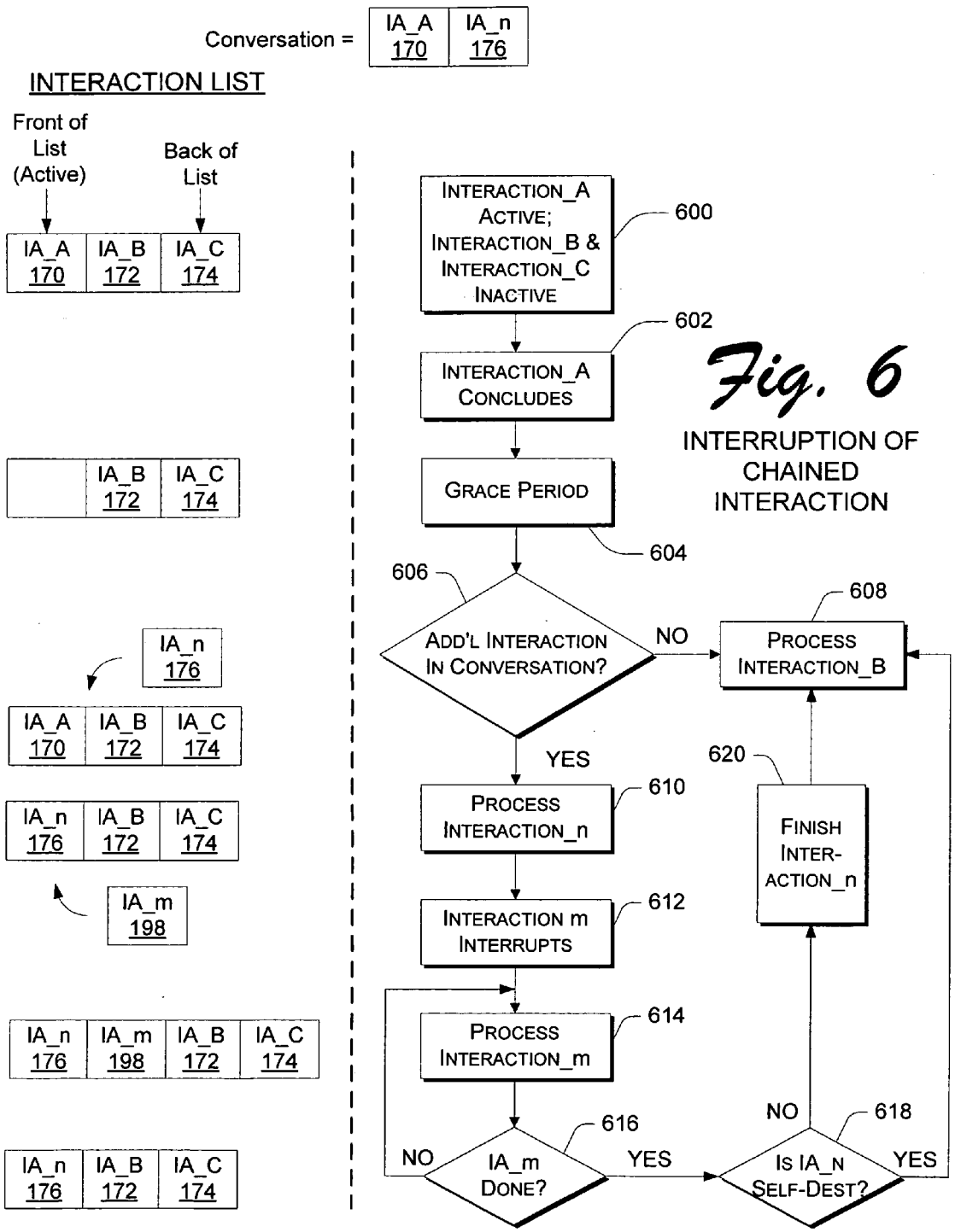
FIG. 6 is a flow diagram depicting a methodological implementation of chained interaction interruption.

FIG. 6 is a flow diagram depicting the process of interrupting a chained interaction. Once again, a current state of the interaction list 168 is shown corresponding to each portion of the flow diagram. Also, it is assumed that an application wants to process a conversation consisting of interaction_A 170 and interaction_n 176.

At block 600, interaction_A 170 is active while interaction_B 172 and interaction_C 174 are inactive and waiting in the interaction list 168 to be processed. When interaction_A 170 concludes processing at block 702, a grace period is established at block 604.

If no interaction is submitted by the same application ("No" branch, block 606), then interaction_B 172 is processed at block 608. However, in this example, interaction_n 176 is submitted before the grace period expires ("Yes" branch, block 606). Therefore, interaction_n 176 begins processing at block 610. At block 612, interaction_m 198 is submitted and is flagged to be processed immediately, so it begins processing at block 614. Interaction_m 198 continues to be processed until it is completed ("No" branch, block 616). When interaction_m 198 has concluded ("Yes" branch, block 616), the interaction manager 160 determines if interaction_n 176 (which was interrupted) is set to self-destruct in the event that it is interrupted. If interaction_n 176 is to self-destruct ("Yes" branch, block 618), then interaction_B 172 begins to be processed at block 608. If interaction_n 176 does not self-destruct ("No" branch, block 618), then interaction_n 176 finishes processing at block 620.

Grace Period Interruption: Methodological Implementation

Figure 7:
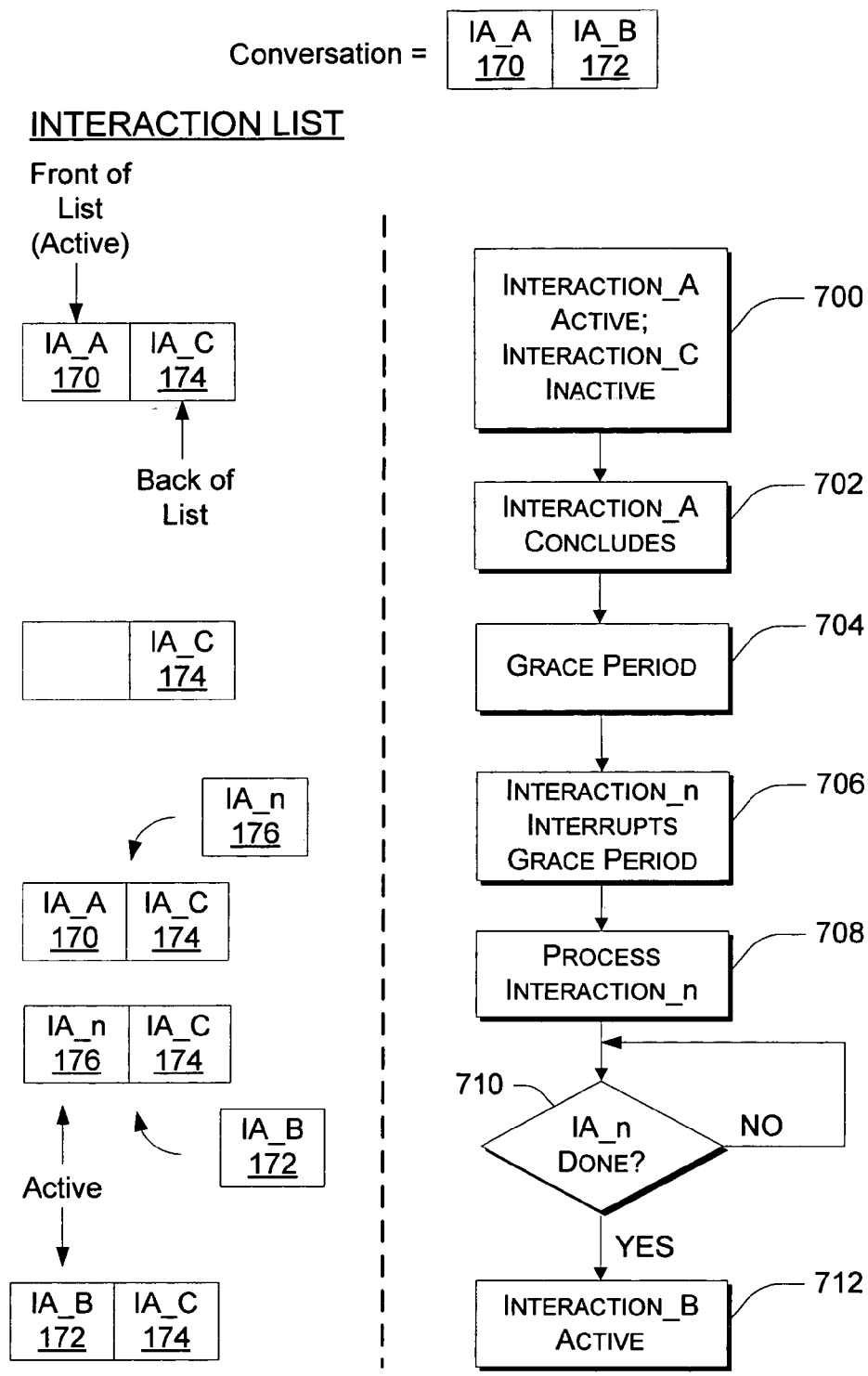
FIG. 7 is a flow diagram depicting a methodological implementation of grace period interruption.

Interruptions may also occur during a grace period, because the grace period does not preclude any application from interrupting. FIG. 7 is a flow diagram that depicts the process that takes place when an application submits an interrupting interaction during a grace period. As before, a current state of the interaction list 168 is shown corresponding to the blocks of the flow diagram.

At block 700, interaction_A 170 is active while interaction_B 172 and interaction_C 174 are inactive and waiting in the interaction list 168 to be processed. When interaction_A 170 concludes processing at block 702, a grace period is established at block 704.

Before the grace period has timed out, interaction_n 176 interrupts and is placed at the front of the interaction list 168 (block 708). It is noted that interaction_n 176 is not a part of the conversation that began with interaction_A 170. Interaction_n 176 is processed at block 708 for as long as the interaction needs to run ("No" branch, block 710). Only when interaction_n 176 has concluded processing ("Yes" branch, block 710) will interaction_B 172—the second interaction of the conversation—be processed (block 712).

Do not Add Interaction to Non-Empty List

An application may also indicate that an interaction is not to be added to the interaction list if the interaction list is not empty at the time the interaction is submitted. One scenario in which this might be desirable is in the event that an application included a verbal clock that announced a current time every minute. If, during the time where the minute would normally be announced, another application was speaking to the user, the announcement interaction would not be added to the interaction list, because the announcement might be out of date by the time it is processed.

Another scenario might be a navigation application that announces a current location, block by block, as one drives, e.g., "You are on $1^{st}$ and Main" . . . "You are on $2^{nd}$ and Main," etc. It would not be desirable to add such interactions to the interaction list if the driver were speaking to another application.

Exemplary Grammar(s) & Grammar Attributes

The interaction manager 160 must also use specific attributes of each grammar that it processes to process grammar interactions correctly. When the speech system 102 is initially booted, any applications that are present at startup are registered with the master grammar table 162 (whether running or not) so that the speech system 102 is aware of each grammar that may possibly be active. Additionally, if an application launches or is added while the speech system 102 is running, the application will register its grammar in the master grammar table 162.

Figure 8A:
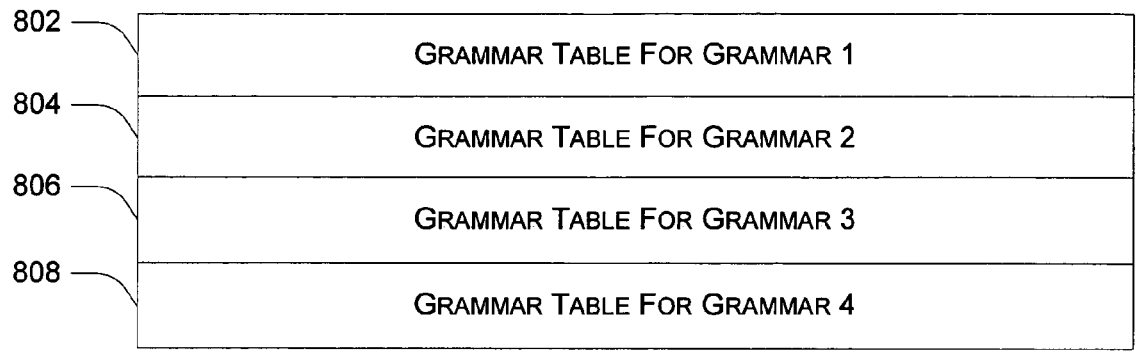
FIG. 8a is a diagram of an exemplary master grammar table.

FIG. 8a is an illustration of a master grammar table 800 similar to the master grammar table 162 shown in FIG. 1. The master grammar table 800 is a table of grammar tables, there being one grammar table for each grammar available to the system.

As shown in FIG. 8a, a grammar table 802 for grammar_1 136 is included in the master grammar table 800. Similarly, a grammar table 804 for grammar_2 138, a grammar table 806 for grammar_3 140 and a grammar table 808 for grammar_4 152 are included in the master grammar table 800. It is noted that practically any number of grammar tables may be stored in the master grammar table 800 between grammar table 802 and grammar table 806.

Figure 8B:
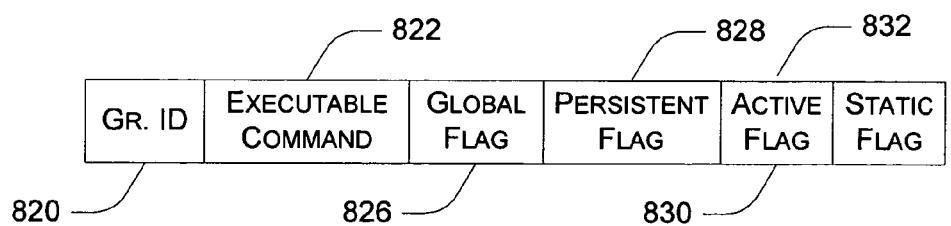
FIG. 8b is a diagram of an exemplary grammar table and its components.

FIG. 8b is a more detailed illustration of a grammar table 810 similar to the grammar tables 802-806 shown in FIG. 8a. Grammar table 810 includes several members: a grammar identifier 820; an executable command 822; a global flag 826; a persistent flag 828; an active flag 830; and a static flag 832. Each of the members 820-832 included in the grammar table 810 specifies an attribute of a grammar associated with the grammar table 810.

The grammar identifier 820 is a value that is uniquely associated with a grammar that corresponds to the grammar table 810. The grammar identifier 820 is used with interactions to identify a grammar that is associated with the grammar identifier. Including the grammar identifier 820 with an interaction solves a problem of latency that is inherent in the speech system 102. After an application submits an interaction that is placed in the interaction list 168 of the interaction manager 160, the application must wait until the interaction reaches the front of the interaction list 168 before it is processed. When the interaction finally reaches the front of the interaction list 168, the speech server 124 immediately knows which grammar from the master grammar table 162 is associated with and, therefore used with, the interaction. If the grammar identifier 820 were not included in the interaction, the speech server 124 would first have to notify the application that the interaction submitted by the application is about to be processed. Then, the speech server 124 would have to wait for the application to tell it which grammar to utilize. Since the grammar identifier 820 is included with a submitted interaction, the speech server can begin processing the interaction immediately.

The executable command 822 is a command (including a path if necessary) that may be used to launch an application associated with the grammar table 820. This allows the speech server 124 to launch an application with the executable command 822 even though the corresponding application is not loaded into the system. If the speech server 124 receives an indication that a recognition occurs for a particular grammar, the speech server 124 passes the recognition to an application that has registered the grammar if such an application is running. If, however, no application using the identified grammar is running, the speech server 124 launches the application and passes the recognition to the application. This solves the problem of having to first launch an application manually before it may receive a command.

The Speech

For example, suppose an automobile driver is driving down the road when she decides she wants to play an MP3 file by, say, David Bowie, on the automobile radio. Assume for this example, that the executable command 822 is a typical path such as "\win\ . . . \mp3.exe" and that the recognition term 824 is "play mp3."

Instead of having to manually activate an MP3 player and then command it to "play David Bowie," the driver simply commands the system to "play MP3 David Bowie." Even though the MP3 player may not be running, the speech server 124 will recognize the command "play MP3" and execute the executable command 822 to start the MP3 player. The grammar associated with the MP3 player (not shown) will recognize "David Bowie" and play the desired selection that is associated with that command.

The global flag 826 is a value that, when set, indicates that the grammar associated with the grammar table 810 is a global grammar that may not be interrupted by another application or the speech system 102 (but only the same application). If the global flag 826 is not set, then the grammar is a yielding grammar that can be interrupted by other applications or by the speech system 102. As will be discussed in greater detail below, a global grammar is always active, although parts of it may be deactivated by the application to which it corresponds.

It is noted that the global flag 826 may be implemented as a yielding flag (not shown) which, when set, indicates that the grammar is not a global grammar. The logic described for utilizing the global flag 826 would, in that case, simply be reversed.

The persistent flag 828 is a value that, when set, indicates that the grammar associated with the grammar table 810 is persistent and not transient. A persistent grammar is a grammar that is loaded by default when the speech system 102 is running, irrespective of the run state of its corresponding application. If the persistent flag 828 is set, then the grammar associated with the grammar table should not be removed from the master grammar table 800.

The active flag 830 is a value that, when set, indicates that the grammar associated with the grammar table 810 is currently active. When a grammar is active, the speech recognitions system 102 actively listens for the commands included in the grammar. When an interaction is submitted to the interaction manager 160, the interaction manager 160 indicates to the speech server 124 that other grammars should yield to a certain grammar if applicable. The speech server 124 sets the active flag 830 to a value that indicates the grammar associated with the grammar table 810 is active. Simultaneously, the interaction manager 160 will clear the active flag 830 for each yielding grammar in the master grammar table 162. As a result, the set of commands that the speech system 102 listens for is reduced.

When the yielding grammars are de-activated, i.e., the active flags are cleared, any grammar that is global (i.e., the global flag 826 is set) remains active. This is because a global grammar is always active. Therefore, at any given time that an application is executing, the speech system 102 is listening for all global grammars in the master grammar table 800 and one yielding grammar that is currently active (i.e., is associated with the application that is currently executing) in the master grammar table 800. If no application is currently executing, the speech system 102 listens for all grammars, whether global or yielding.

In one implementation, the speech server 124 does not de-activate all yielding grammars other than a grammar associated with a currently executing application unless an interaction in the interaction list 168 includes a method that informs the speech server 124 that all other yielding grammars should be de-activated. When the interaction manager 160 identifies such a method, the interaction manager 160 sends a message to the speech server 124 to de-activate all other yielding grammars in the master grammar table 162.

Finally, the static flag 832 is a value that, when set, indicates that the grammar associated with the grammar table 810 is a static grammar and, therefore, will not change after it is registered in the master grammar table 162.

Miscellaneous Functional Scenarios

The functional scenarios that follow are not discussed in detail with respect to the speech system 102, but may also be implemented with the features described above. The functional scenarios merely require that the interaction manager 160 be configured to handle the scenarios.

Push-to-Talk

Push-to-talk (PTT) is used to indicate that a command from the user is imminent, which allows a user to initiate a command. For example, a user may PTT and say "lock the doors" to actuate a vehicle's door locks. A push-to-talk (PTT) event instantiated by a user interrupts any current interaction.

PTT may also be used to provide a response to a system-initiated interaction. For example, if a navigation application asks "Fast or scenic route," the user pushes push-to-talk and answers "fast" or "scenic."

Barge-in

The speech server 124 may also be configured to allow a user to "barge in" with a response. For example, if a navigation application asks "Fast or scenic route," the user may interrupt—without PTT—and answer "fast" or "scenic."

Immediate Response to User Command

The speech server 124 may be configured to provide an immediate response to a user command. For example, while an automobile system is announcing a driving instruction to a driver, the driver commands the system to "disconnect." The speech server 124 either disconnects immediately or confirms the disconnect command by stating "OK to disconnect", interrupting the original driving instruction.

Application-Aborted Interaction

The applications 170-176 may also abort an interaction in certain circumstances. For example, a navigation application needs to tell a driver that a point of interest is drawing near, but other applications are currently talking to the driver. By the time the other applications have concluded, the point of interest is passed. The navigation application aborts the announcement interaction before it begins. If the point of interest has not been passed, the announcement is made, delaying only until the other applications have concluded.

Interaction-Specific Grammar

The speech server 124 may also de-activate some grammars and leave active an interaction-specific grammar. For example, a navigation application asks a driver "fast or scenic route." Since the interaction is expecting a specific reply for a specific grammar, the specific grammar is activated (or remains active) to give the words "fast" and "scenic" priority over other grammars. This reduces the overhead required to process the driver's response, since the speech server 124 does not have to listen for as many terms.

Enhanced Prompt after Interruption

The speech server 124 may also be configured to enhance a prompt during an interrupted conversation. If, for example, a navigation application asks for the driver's destination by stating first "please say the state." The driver responds with the destination state. The navigation application then asks "please say the city." However, during the announcement or before the driver answers with the destination city, the question is interrupted with an important announcement. After the announcement concludes, the original conversation resumes. To make up for the lost context, the speech server 124 is configured to revise the question to "for your destination, please say the city." By re-focusing the driver on the navigation application conversation, the driver is less likely to be confused about what the system is saying.

Speech Controls

The speech controls 154-158 are provided in the speech server 124 to provide timesaving tools to developers who create applications to run with the speech server 124. The speech controls 154-158 are computer-executable code modules that provide canned functions for developers to use for common interactions utilized in speech-enabled applications, thereby saving the developers the time and effort required to code the interaction for each use.

Question Control

The question control 154 gives an application developer an easy way to create various modal, system-initiated interactions, or dialogues. Such interactions are used to obtain information from a user by asking the user a question. The following scenarios exemplify common uses of the question control to obtain desirable characteristics.

User Interface Consistency: A user tries an in-car computer system in his friend's car. He then goes out to shop for a new car. He notices that although other systems sound a little different, working with their speech user interface dialogues is just the same.

Application Compatibility: A user buys a full-featured navigation system software package for her car computer. She then buys a new car of a different make. She is still able to install her navigation software in her new car and it works the same as it did in her old car.

Hardware/Software Compatibility: A developer can design a unique speech hardware and/or software subsystem to work in conjunction with the question control without compromising application compatibility or user interface consistency.

The question control allows flexible programming so that a variety of question scenarios can be implemented. For example, the question control may be used to ask a driver a simple question that may be answered "yes" or "no", or a more complex question such as "fast or scenic route" and receive "fast" or "scenic" as appropriate answers.

The question control also allows greater flexibility by allowing the use of dynamic grammars. A question control has a grammar associated with it. In the above examples, the grammar may only consist of "yes" and "no" or "fast" or "scenic." The question control can be configured by a developer or OEM to standardize behavior of certain types of questions that can't be provided with a simple list. For example, a hierarchical grammar such as a time or date grammar may be associated with a question control. Such types of grammars involve too many list choices to practically list for a user.

The question control may also be used to provide an interrupting question. For example, while a system is reading a news story via TTS, a car application asks "<ding>— Your gas tank is close to empty; do you want instructions to the nearest gas station?" Similarly, a question programmed with the question control may be interrupted. For example, while an e-mail application is asking "You have mail; do you want to read it now?" a car application announces, "<ding>—Your engine is overheating."

Table 1 lists question control properties and types. Discussion follows.

TABLE 1

| PROPERTY | TYPE |
| --- | --- |
| Type | Enumeration |
| Interrupting | Boolean |
| Prompt | String |
| Prompt Verbose | String |
| Earcon Mode | Enumeration |
| App-Provided Grammar | Grammar |
| List Choices | Boolean |
| Selection Feedback | Enumeration |

Question Control Properties

TYPE PROPERTY—The question control supports a Type property that can be used to determine the behavioral or content characteristics of the application using the question control. The Type property ultimately determines properties used in defining the application's behavior.

INTERRUPTING PROPERTY—The Interrupting property determines whether the application will interrupt other interactions in the interaction list 168 of the interaction manager 160. If the Interrupting property value is true, then the application (i.e., the question created with the question control) interrupts any other interaction in the interaction list 168. If the Interrupting property is false, then the application does not interrupt other interactions, but places its interactions at the end of the interaction list 168.

PROMPT PROPERTY—The question control is able to verbally prompt a user in order to solicit a response. The Prompt property contains what is announced when the application/question is started. The Prompt property value is interpreted according to the value of a PromptType property, which is text-to-speech or pre-recorded. If the prompt is TTS, then the prompt announces the TTS string. If the prompt is pre-recorded, then the prompt announces the contents of a file that contains the recording.

PROMPT VERBOSE PROPERTY—The Prompt Verbose property is a prompt that an interaction plays if the application/question is re-activated after it is interrupted. This property may be NULL and, if so, the interaction plays whatever is specified by the Prompt property (the prompt initially stated at the beginning of the interaction (i.e., application/question). Similar to the Prompt property, the Prompt Verbose property includes a PromptType that may be a TTS string or a string stored in a file.

EARCON MODE PROPERTY—The Earcon Mode property determines if the question control will play an audio file when the question control is activated or re-activated. The audio file played is determined by a currently selected Type property. The Type property may be "Always," "After Interruption" or "Never."

If the Type property is "Always," then the audio file always plays on activation or re-activation. For example, if the audio file is a "ding" then the "ding" will be played when the system initiates a sole interaction or a first interaction in a conversation.

If the Type property is "After Interruption," then the audio file is only played on re-activation. For example, if a car system asks a user "Fast or scenic route" after first being interrupted by a global announcement, the audio file (i.e., "ding") sounds before the question repeats after the interruption.

If the Type property is "Never," then the audio file is never played. The application may modify the Type property between "Always" and "Never." The "Never" Type property may be set by an application when the application has a special need not to play the audio file.

APPLICATION-PROVIDED GRAMMAR—An application can provide the question control with a list of options from which the user may choose. For each option offered, the application may provide one or more phrases whose recognition constitutes that choice. Any choices added are in addition to any grammars implemented in the question control. For example, a navigation application may provide a list having two options, "fast" and "scenic." If the words "fast" and "scenic" are not already included in an active grammar, then they are automatically added.

In one implementation, the question control provides a 'spoken choice' feature. The spoken choice feature may be used when a question is configured to have two or more possible answers for one answer choice. For example, a question may ask "What is the current season?" The answers may be "Spring, Summer, Autumn and Winter." In addition, the word "Fall" may be used instead of "Autumn." The question control may be configured to respond to a user inquiry as to possible answers as including either "Autumn" or "Fall." As a result, the list choices provided to a user would be "Spring, Summer, Autumn and Winter," or "Spring, Summer, Fall and Winter."

Another user for the spoken choice feature is for speech systems that may mispronounce one or more words. For example, many speech systems will mispronounce Spokane, Wash. as having a long "a" sound, since that is how phonetics rules dictate (instead of the correct short "a" sound). If a speech system is to announce the word "Spokane" to a user, the question control (or another control) can be programmed to play a designated audio file that correctly pronounces Spō-kan instead of using a standard TTS. In another implementation, the correct pronunciation may be specified as a spoken choice string, as described above.

The application's various grammars are activated in the system immediately upon starting the control. This provides for the user's ability to barge in (using push-to-talk) and respond to the question control before it is finished.

LIST CHOICES PROPERTY—The List Choices property determines whether the question control will automatically TTS the list of valid choices to a user after playing the prompt. This option is particularly useful when the user is likely to be unaware of the valid responses. For example, a navigation application may ask a driver who has just entered a destination "Which route would you like to take, fast or scenic?"

SELECTION FEEDBACK PROPERTY—The Selection Feedback property determines if the question control will play feedback automatically when the user answers one of the application-provided or system-provided options that are enumerated by the List Choices property. If the Selection Feedback property has a value of "None," no feedback is played when the user makes a choice. If the Selection Feedback property has a value of "Earcon," then a designated satisfaction earcon is played when the user makes a choice. If the Selection Feedback property has a value of "Echo Choice" value, then a TTS of the user's choice is played when the user makes a choice.

Figure 10:
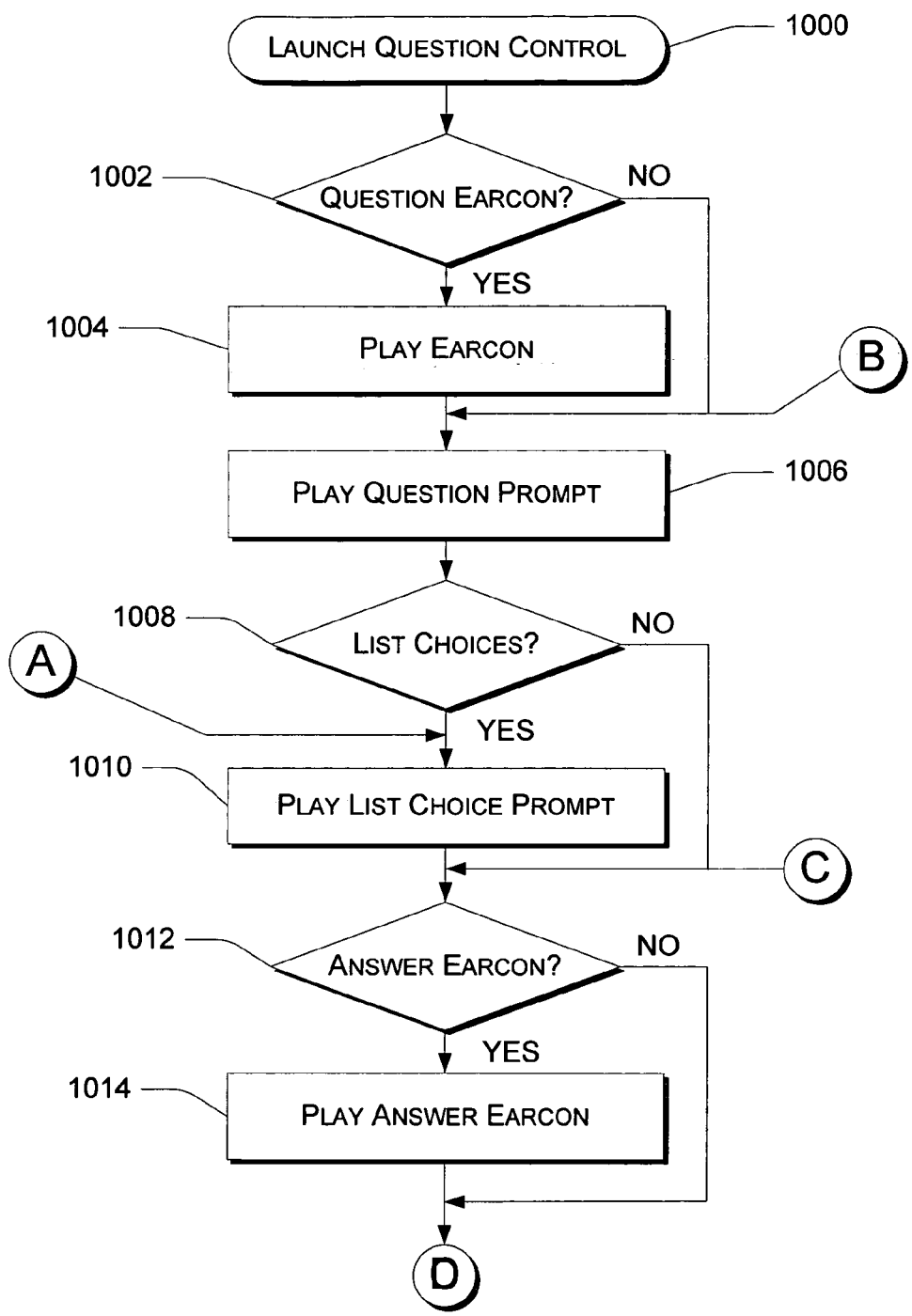
FIG. 10 is a flow diagram of a question control process.
Figure 10:
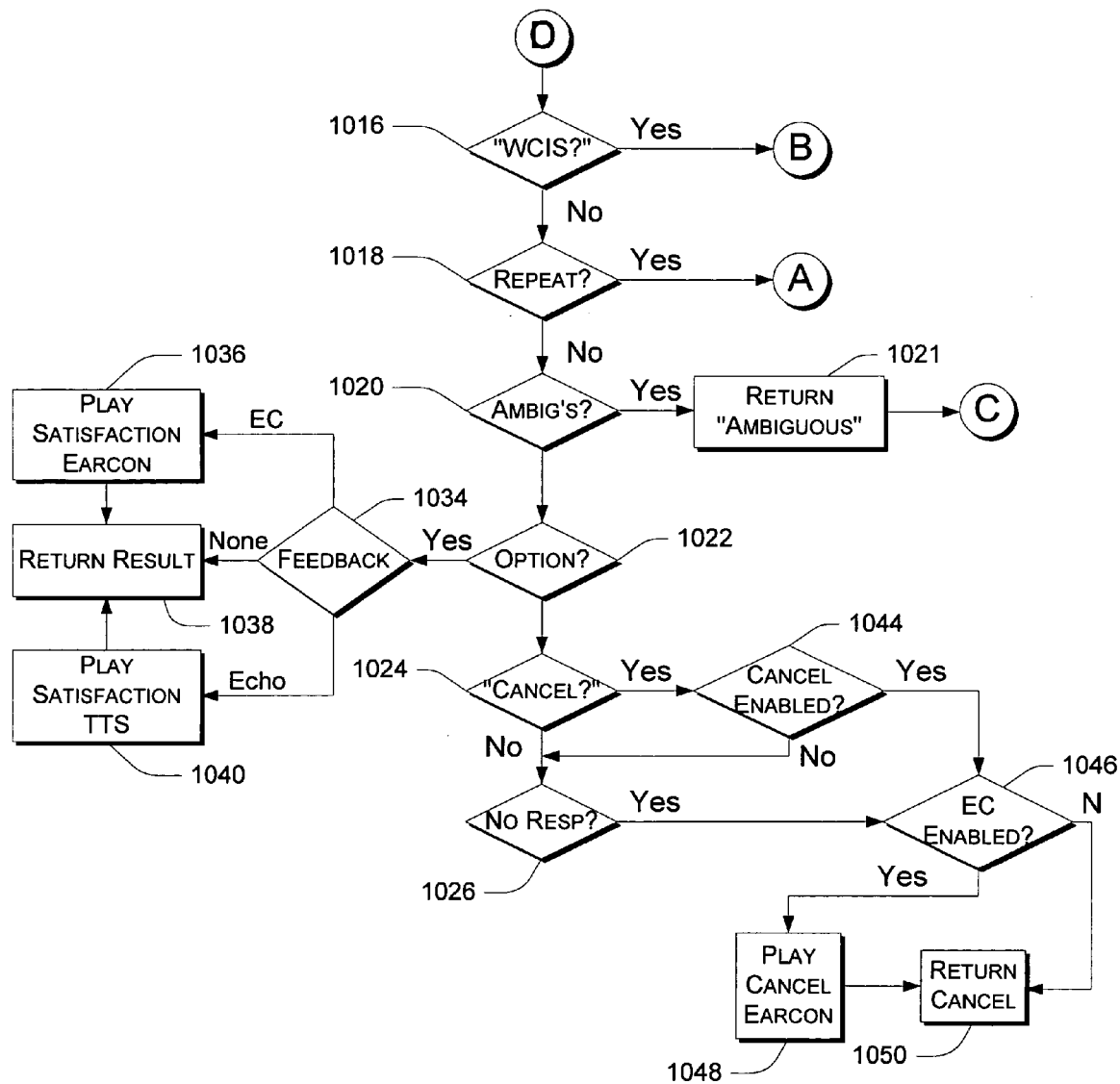

FIG. 10 is a flow diagram depicting a question control process. The question control process depicted in FIG. 10 is only one way in which the question control may be implemented.

At block 1000, the question control is launched. If there is an earcon to be played to indicate a question prompt is about to be asked ("Yes" branch, block 1002), then the earcon is played at block 1004. Otherwise, no earcon is played ("No" branch, block 1002). The question prompt is then played at block 1008.

The choices with which the user may respond to the question prompt may be announced for the user at block 1010 ("Yes" branch, block 1008). But this may not be desirable and, therefore, the play list choices block may be skipped ("No" branch, block 1008.

Just as an earcon may be played to alert the user that a question prompt if forthcoming, an earcon may also be played after the question (block 1014) prompt to indicate to the user that the system is ready for the user's answer ("Yes" branch, block 1012). If this is not desirable, the application may be programmed so that no such earcon is played ("No" branch, block 1012).

Blocks 1016-1026 represent the possible user responses to the question prompt (block 1008). At block 1016, the user may answer "What can I say?" ("Yes" branch, block 1016) indicating that the user desires to hear the possible responses to the question prompt. Control of the process then returns to block 1010, where the play list choice prompt is repeated to the user.

If the user's response is to repeat the question prompt ("Yes" branch, block 1018), then control of the process returns to block 1006, where the question prompt is repeated to the user. If the user's response is ambiguous, i.e., it is a response that the system does not understand ("Yes" branch, block 1020), then the system TTS's "Answer is ambiguous" at block 1021. Control of the process returns to block 1012 to receive a new answer from the user.

If the question control receives a valid response from the user ("Yes" branch, block 1022), then feedback may be returned to the user to verify that the user has returned a valid response. If there is no feedback ("None" branch, block 1034), then the result, i.e., the user's choice, is returned by the question control at block 1038. If the feedback is an earcon to indicate a valid response ("EC" branch, block 1034), then the earcon is played at block 1036 and the result is returned to the application at block 1038. If the feedback is to play TTS of the user's choice ("Echo" branch, block 1034), then the user's response is TTS'd to the user at block 1040 and the response is returned by the question control to the application at block 1038.

In one implementation of the question control described herein, a user may have an option to cancel a question process. If the user's response to the question prompt is to cancel ("Yes" branch, block 1024), and if canceled is enabled ("Yes" branch, block 1044), then the question is canceled. If an earcon is to be played to verify the cancellation ("Yes" branch, block 1046) then the appropriate earcon is played at block 1048 and a 'cancel' value is returned to the application to indicate the cancellation. If an earcon is not to be played upon cancellation ("No" branch, block 1046, then 'cancel' is returned at block 1050 without playing an earcon.

If the cancel option is not enabled ("No" branch, block 1044), then the system does not respond to the "cancel" command. If after a pre-determined timeout period elapses without receiving a response from the user ("Yes" branch, block 1026), the 'cancel' is returned to the application at block 1050. 'Cancel' is returned after an earcon is played (block 1048) if a cancel earcon is enabled ("Yes" branch, block 1044). Otherwise ("No" branch, block 1048), 'cancel' is returned without first playing a cancel earcon. (Note that there is not a "No" branch to block 1026; this is due to the fact that if a response is returned, the response will have been handled before a determination is made as to whether a response was received during the timeout period.) Other implementations may handle the process of the control differently.

Announcer Control

The announcer control 155 provides a developer an easy way to deliver verbal feedback to users, including short notices and long passages of text-to-speech. The announcer control 155 implements a simple mechanism for playing pre-recorded speech or TTS text, and for giving a user standardized control of such playback. Use of the announcer control 155 significantly decreases the effort required by application developers to build a rich application user interface.

The following scenarios exemplify common applications of the announcer control 155.

READ E-MAIL: A user request that an electronic mail message be read. The system begins TTS'ing the message.

The user is able to pause, fast forward, rewind, etc.

INTERRUPTING ANNOUNCER: While a navigation application is asking "Fast or scenic route?" the user commands "Read e-mail." The system begins to read the e-mail immediately.

INTERRUPTED ANNOUNCER: While the system is reading a news story via TTS, an automobile application asks "<ding> Your gas tank is close to empty. Do you want instructions to the nearest gas station?"

NOTIFICATION: E-mail arrives while a user is driving and the system announces, "<ding> E-mail has arrived."

CONVERSATION STATEMENT: A user answers the last question to specify a navigation destination and the system announces, "Turn right at the next intersection."

REPEATED ANNOUNCEMENT: A navigation application announces, "<ding> Turn right at the next intersection." But the user did not hear it. The user says, "Repeat" and the system repeats the announcement.

The following features, or properties, may be available on the announcer control 155. Table 2 lists announcer control properties and types. Discussion follows.

TABLE 2

| PROPERTY | TYPE |
| --- | --- |
| Type | Enumeration |
| Interrupting | Boolean |
| ConversationID | String |
| Abort When Interrupted | Boolean |
| Earcon Mode | Enumeration |
| Announcement | String |
| Cancel Feedback | Boolean |
| Post Delay | Integer |

Announcer Control Properties

TYPE PROPERTY: The announcer control 155 supports the Type property that can be used to determine the behavioral or content characteristics of the application/announcement. The Type property ultimately determines the properties used in defining the application's/announcement's behavior. The speech server 124 defines the Type property's valid values.

INTERRUPTING PROPERTY: The Interrupting property determines whether the application/announcement will interrupt other interactions present in the interaction list 168 of the interaction manager 160. If the Interrupting property value is True, an announcement interaction will immediately interrupt any other interactions in the interaction list 168. If the value is False, an announcement interaction will be placed at the end of the interaction list 168.

CONVERSATION ID PROPERTY: The Conversation ID property determines whether the application/announcement will operate in the context of the named conversation. The Conversation ID property is a string associated with a control instance. The interaction queue uses the Conversation ID property o identify which interaction belongs with which conversation.

ABORT WHEN INTERRUPTED PROPERTY: The Abort When Interrupted property determines whether the announcement will automatically self-destruct if it is interrupted by another interaction. If the property value is True, then the announcement aborts when interrupted; if the value if False, the announcement does not abort.

EARCON MODE Property: The Earcon Mode property determines if the application will play an audio file when it is activated or re-activated. If the Earcon Mode property has a value of "Always" the designated audio file is always played upon activation or re-activation. If the value is "After Interruption" the audio file is only played on re-activation; not on activation. If the value is "Never" an audio file is not played on activation or re-activation.

ANNOUNCEMENT PROPERTY: The Announcement property contains what is announced when the control is started. If an Announcement Type associated with the Announcement property is "TTS," then the Announcement property contains a string that is to be TTS'ed. If the Announcement Type is "Pre-recorded," then the Announcement property contains a string designating a file to be announced, i.e., a file name. If the Announcement Type is "Combination," then the Announcement property contains a TTS string and an audio file name.

CANCEL EARCON PROPERTY: The Cancel Earcon property determines if the announcer control will play an audio file automatically when the user answers "cancel" (or its equivalent). If the Cancel Earcon property is True, then an earcon is played upon canceling; otherwise, an earcon is not played.

POST DELAY PROPERTY. The Post Delay property determines if the application will pause for a definable period of time after the announcement has been completely delivered. This features gives a user some time to issue a "repeat" or "rewind" command. It also provides for a natural pause between interactions. If the Post Delay property value is True, then a post delay is provided when not in the context of a conversation. If the value is False, then a post delay is not provided.

Figure 11:
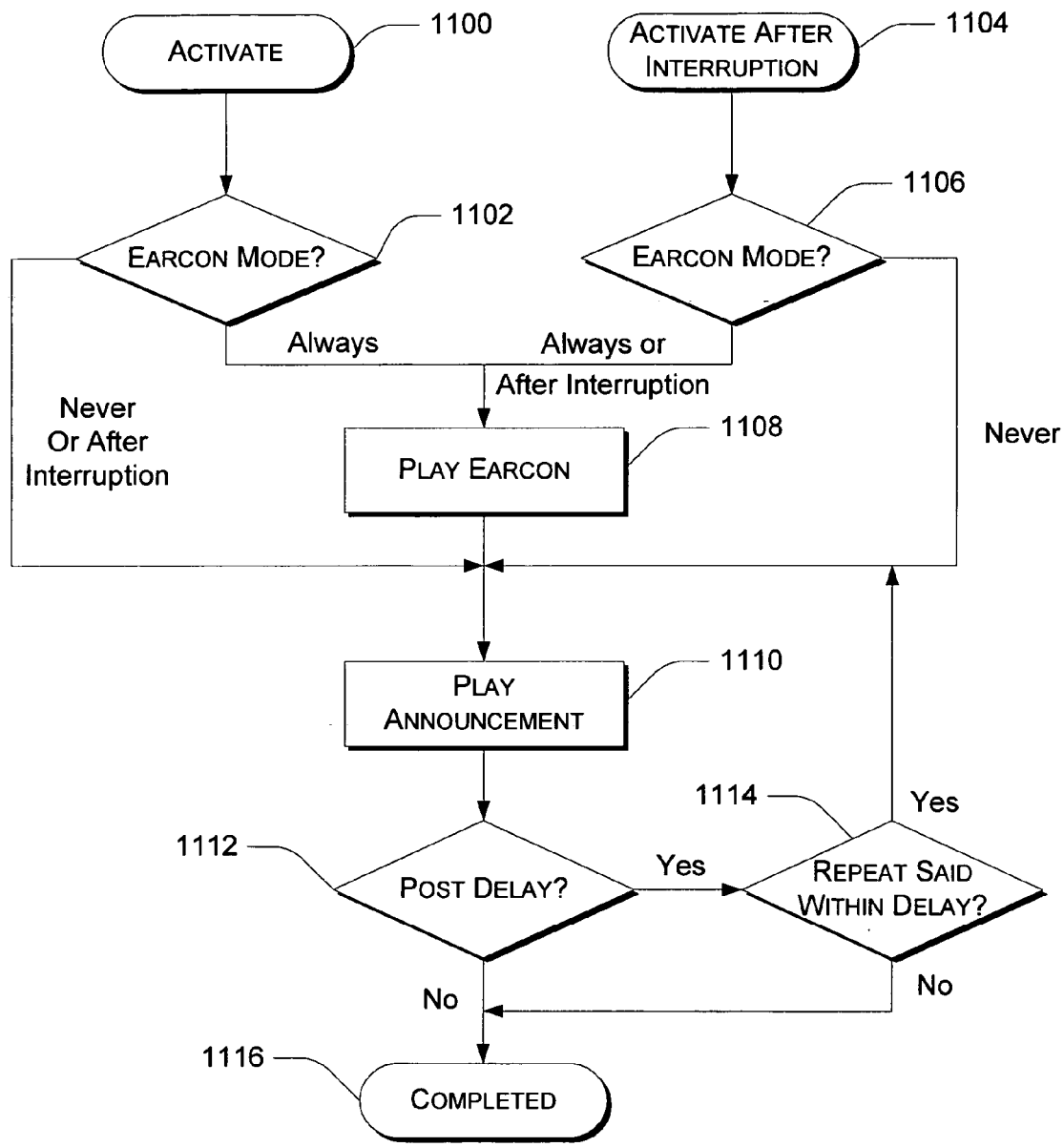
FIG. 11 is a flow diagram of an announcer control process.

FIG. 11 is a flow diagram depicting an announcer control process. At block 1100, the announcer control is activated at some time other than after an interruption. If an earcon mode associated with the announcer control that may be set to "Always," "Never," or "After Interruption." If the earcon mode is set to "Always" ("Always" branch, block 1102), then an earcon is played at block 1108, prior to an earcon being played at block 1108. If the earcon mode is set to "Never" or "After Interruption" mode ("Never or After Interruption" branch, block 1102), then an earcon is not played before an announcement is played at block 1108.

There may be a post delay after the announcement has completed ("Yes" branch, block 1112. If the user asks the system to repeat the announcement during a post delay period ("Yes" branch, block 1114), then the announcement is replayed at block 1110. If the user does not ask the system to repeat the announcement during the post delay period ("No" branch, block 1114), then the process completes at block 1116.

A post delay may not be activated for the announcement control. If not ("No" branch, block 1112), then the process completes at block 1116 immediately after the announcement is played at block 1110.

Activation of the announcement control may occur after an interruption at block 1104. If an interruption occurs before the announcement control is activated and the announcement control earcon mode is set to play an earcon "Always" or "After Interruption" ("Always or After Interruption" branch, block 1106), then an earcon is played at block 1108 to alert the user that an announcement is forthcoming. The announcement is then played at block 1110. If the earcon mode is set to "Never" ("Never" branch, block 1106), then the announcement is played at block 1110 without playing an earcon at block 1108.

Thereafter, a post delay may be implemented ("Yes" branch, block 1112) wherein the user may ask the system to repeat the announcement ("Yes" branch, block 1114), in which case the announcement is repeated at block 1110. If a post delay is not implemented ("No" branch, block 1112), or if no response is received during a post delay period ("No" branch, block 1114), then the process concludes at block 1106.

Command Control

The command control 156 is designed to easily attach command-and-control grammar to an application. The command control 156 is used for user-initiated speech. At a minimum, the command control 156 must perform two functions. First, the command control 156 must provide a way for an application to specify what grammar(s) the application is interested in listening to. Second, the command control 156 must communicate back to the application that a recognition has occurred. To accomplish these tasks, the command control 156 is made up of four objects.

Figure 12A:
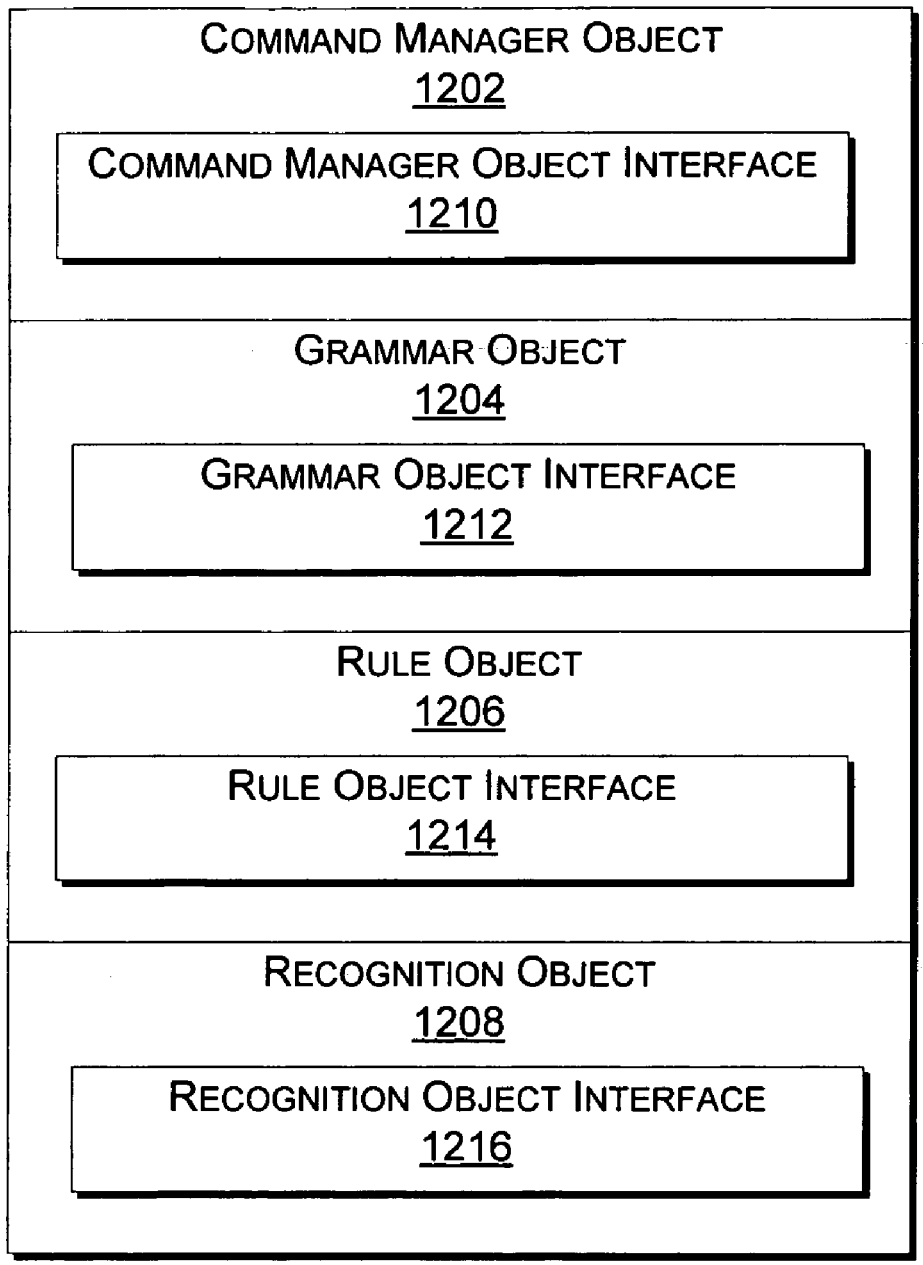
FIG. 12a is a block diagram of a command manager control.

FIG. 12 is a block diagram of a command control 1200 similar to the command control 156 shown in FIG. 1. The command control 1200 includes a command manager object 1202, a grammar object 1204, a rule object 1206 and a recognition object 1208. For purposes of further discussion, the command control 1200 is assumed to be an ActiveX control that conforms to ActiveX standards promulgated by Microsoft Corporation.

Each of the four objects 1202-1208 includes an interface: the command manager object interface 1210, the grammar object interface 1212, the rule object interface 1214 and the recognition object interface 1216. The interfaces 1210-1216 of each object 1202-1208 will be discussed separately in greater detail.

The command manager object interface 1210 has three properties: Persistence ID 1220; Grammar ID 1222; and Grammar 1224. The Persistence ID 1220 is used to identify the application for persistence purposes. The Persistence ID 1220 must be unique in the system. The Persistence ID 1220 may be blank if the associated grammar is not persistent. In one implementation, the Persistence ID 1220 is a ProgID (Microsoft WINDOWS implementation).

The Grammar ID 1222 is an identifier that is used by with interactions 170-176 submitted to the interaction manager 160. As previously explained, the Grammar ID 1222 is utilized to avoid latency problems inherent in the speech system 102. The Grammar 1224 property is a pointer to the Grammar Object 1204 that is associated with the Command Control 1200.

The command manager object interface also includes several methods: Create Grammar 1226, Persist 1228, Remove Grammar 1230, Start 1232 and Event: Recognition 1234. Create Grammar 1226 is a function that is used to create a new grammar object from a grammar file. A grammar file may be an XML (extended markup language) file or a compiled grammar file (.cfg) or NULL, indicating that a new grammar is to be built. Parameters for Create Grammar 1226 include a path of a file to be opened or NULL for a new grammar (file), a value that indicates whether a grammar is static or dynamic (Load Options), a value that indicates whether a grammar is yielding or global (Context Options), and a pointer that receives the grammar object (ppGrammar).

Persist 1228 is a method that indicates that a grammar is to be persisted. Persisted grammars recognize even if the application with which they are associated are not running. If a recognition occurs, the application is launched. Persist 1228 includes two parameters: the grammar under which the ID should be persisted (Persistence ID); and a complete path for an executable that will handle grammar recognitions (Application Path).

Remove Grammar 1230 is a method that removes a grammar from the speech server 124. If the grammar is persistent, Remove Grammar 1230 un-persists the grammar. Start 1232 is a method that is called to let the speech server 124 know that an application is ready to start handling events. Event: Recognition is a method that is called by the speech server 124 when a speech recognition occurs so that an appropriate application may be so notified.

A specific implementation of the command manager object interface 1210 is shown below. The implementation is specific to the WINDOWS family of operating systems by Microsoft Corp. Other interfaces may be added to make the command control and ActiveX control (provided by the ATL wizard) so that a developer can simply drop the control on a form and proceed.

```
interface ICommandManager : IUnknown, IDispatch
{
Properties :
        BSTR PersistenceID; (get/put)
        DWORD GrammarID; (get only)
        IDispatch* Grammar; (get only)
Methods :
CreateGrammar (BSTR File, SPEECH_LOAD_OPTIONS
    LoadOptions, SPEECH_CONTEXT_OPTIONS
    ContextOptions, IDispatch** ppGrammar)
        HRESULT Persist (BSTR PersistenceID, BSTR
            ApplicationPath)
        HRESULT RemoveGrammar ( )
        HRESULT Start( ):
};
interface _ICommandManagerEvents: IDispatch // this
    interface is the event that is sent back on recognition//
{
HRESULT Recognition(IDispatch * Recognition,
    DWORD CountAlternates);
}
```

The Grammar Object Interface 1212 has an Enabled property 1236, a Rule method 1238, a Create Rule method 1240, and a Commit method 1241. The Enabled property 1242 is used to turn the entire grammar on or off. The Rule method 1248 selects a rule (by ID or name) and returns it to the caller. The Rule method 1248 includes a RuleID parameter that is either a numeric ID for the rule or a string for the rule name.

The Create Rule method 1240 creates a new rule in the grammar. The Create Rule method 1240 also utilizes the RuleID parameter, which is a name or numeric identifier of the rule to be created. Other parameters used in the Create Rule method 1240 include Rule Level, Rule State, ppRule and Prop. Rule Level is an enumeration determines whether the rule is created as a top level rule or not. Rule State specifies whether the rule is to be created as dynamic. Dynamic rules can be modified after they are committed. ppRule is the rule object that is created. Prop is an optional PropID or PropName that a developer wants to associate with the rule.

The Commit method 1241 method commits all changes made in the grammar and all of the rules.

A specific implementation of the grammar object interface 1212 is shown below. As with the command manager object interface shown above, the implementation is specific to the WINDOWS family of operating systems by Microsoft Corp.

```
interface IGrammar : IUnknown, IDispatch
{
Properties :
    VARIANT_BOOL Enabled (get/put)
Methods :
    IDispatch * Rule(VARIANT RuleID) (get only)
    HRESULT CreateRule ([in] VARIANT RuleID,
        SPEECH_RULE_LEVEL RuleLevel,
        SPEECH_RULE_STATE
        RuleState, [out, retval] IDispatch **ppRule,
        [in, optional]
        VARIANT Prop)
    HRESULT Commit( );
};
```

Rule Class Interface

The Rule Class interface 1214 includes an enabled 1242 property and several methods: Add Rule 1244, Add Phrase 1246, Add Alternate Rule 1248 and Add Alternate Phrase 1250. Enabled 1242, when set, indicates whether a rule is active or inactive. Add Rule 1244 appends a rule to an existing rule structure. For example, if the rule looks like "Rule→Phrase Rule1" and Rule2 is added, then a new structure results, "Rule→Phrase Rule1 Rule2".

In the WINDOWS specific implementation shown below, Add Rule 1244 includes two parameters, plrule, which is a pointer to the rule object that will be added to the rule. Prop is an optional PROPID or PROPNAME that can be associated with the rule.

Add Phrase 1246 appends a phrase to an existing rule structure. In the implementation shown below, the Add Phrase 124 method includes parameters text and val. Text is the text that is to be added. Val is an optional val or valstr that may be associated with the phrase. For this to be set, the rule must have been created with a property.

Add Alternate Rule 1248 places a new rule as an optional path for the previous rule structure. For example, if the structure is "Rule→Phrase Rule1" and then add alternative rule2 results in the new structure "Rule→(Phrase Rule1) |Rule2. Concatenation takes precedence over the 'or' operator. Add Alternate Rule 1248 includes two parameters in the WINDOWS implementation shown below. plrule is a pointer to the rule object that will be added to the rule. prop is an optional PROPID or PROPNAME that may be associated with the rule.

Add Alternate Phrase 1250 places a new string as an optional path for the previous rule structure. If the structure is "Rule→(Phrase Rule1)" and alternative phrase Phrase2 is added, the new structure is "Rule→(Phrase Rul1)|Rule2. Concatenation takes precedence over the 'or' operator. In the WINDOWS implementation shown below, Add Alternate Phrase 1250 includes two parameters. Text is the text to be added. Val is an optional VAL or VALSTR that is to be associated with the phrase. The rule must have been created with a property for this to be set.

A specific implementation of the Rule Object interface 1214 is shown below. As with the other interfaces shown above, the implementation is specific to the WINDOWS family of operating systems by Microsoft Corp.

```
interface IRule : IUnknown, IDispatch
{
Properties :
    VARIANT_BOOL Enabled (put only)
```

-continued

```
Methods :
    HRESULT AddRule ([in] IDispatch *piRule, [optional, in]
        VARIANT Prop)
    HRESULT AddPhrase ([in] BSTR Text, [optional, in] VARIANT
        Val)
    HRESULT AddAlternative Rule ([in] IDispatch *piRule, [optional,1
        in] VARIANT Prop)
    HRESULT AddAlternativePhrase ([in] BSTR Text, [optional, in]
        VARIANT Val)
};
```

EXAMPLE

The Rule Object interface 1214 is designed for building grammars in a BNF (Backus-Naur Format) format. The rule is composed of a Start component that is constructed of either rules or phrases. The Start component corresponds to a top-level rule. For example:

```
S → A B | C
A → "I like"
B → "Candy" | "Food"
C → "Orange is a great color"
```

There are four rules here (S, A, B, C). There are four phrases: "I like"; "Candy"; "Food"; and "Orange is a great color." This grammar allows three phrases to be said by the user "I like candy," "I like food," or "Orange is a great color." To construct this, assume four rules have been created by a grammar object and then build the rules.

S.AddRule(A)
S.AddRule(B)
S.AddAlternativeRule(C)
A.AddPhrase("I like")
B.AddPhrase("Candy")
B.AddAlternativePhrase("Food")
C.AddPhrase("Orange is a great color."

Word Trainer Control

The word trainer control 158 provides an easy way to implement a speech-oriented work-training interaction with a user, in support of tasks that involve voice tags, such as speed-dial entries or radio station names. The entire word training process is implemented with a combination of the word trainer control and other GUI (graphical user interface) or SUI (speech user interface) controls. The word trainer primarily focuses on the process of adding the user's way of saying a phrase or verbally referencing an object in the recognizer's lexicon.

It is noted that the Word Trainer control 158 wraps the word trainer API (application programming interface) provided by MICROSOFT CORP. The features discussed below are available on the word trainer control 158.

An example of a functional scenario for the word trainer control is a user initiating voice tag training to complete creating a speed-dial entry for "Mom." The system prompts the user to say the name of the called party. The user responds, "Mom." Training is then complete.

Another example of a functional scenario for the word trainer control is a user who wants to place a call via voice command, but cannot remember the voice tag that was previously trained. The system helps the user using a question control: "Choose who you'd like to call by repeating the name. <Mom.wav>, <Dad.wav> or <work.wav>.

The following Tables (Tables 3-5) illustrate possible word training sessions that are supported by the word training control 158.

TABLE 3

Scenario "A"

| WHO | WHAT | DETAIL |
|---|---|---|
| System | Prompt | "Say name twice; Please say name" |
| System | Earcon | Signals user to start utterance |
| System | AutoPTT | Lets user talk w/o manual PTT |
| User | Utterance | Says "Mom" |
| System | Feedback | Plays <Mom.wav> |
| System | Prompt | "Please say the name again" |
| System | Earcon | Signals user to start utterance |
| System | AutoPTT | Lets user talk w/o manual PTT |
| User | Utterance | Says "Mom" |
| System | Feedback | Plays <Mom.wav> |
| System | Question | "OK to continue?" |
| System | Announcement | "You can now dial by saying <Mom.wav> |

TABLE 4

Scenario "B"

| WHO | WHAT | DETAIL |
|---|---|---|
| System | Prompt | "Please say name" |
| User | PTT | User pushes PTT |
| System | Earcon | Signals PTT pushed, ready to record |
| User | Utterance | Says "Mom" |
| System | Earcon | Signals recording successful |

TABLE 5

Scenario "C"

| WHO | WHAT | DETAIL |
|---|---|---|
| System | GUI Dialogue | Includes buttons for two training passes |
| User | Pushes #1 | Starts training pass #1 |
| System | Earcon | Signals PTT; Ready to record |
| System | AutoPTT | Lets user talk w/o manual PTT |
| User | Utterance | Says "Mom" |
| System | Feedback | Plays .wav of "Mom" |
| System | Disables #1 | Shows that pass #1 remains |
| User | Pushes #1 | Starts training pass #2 |
| System | Earcon | Signals PTT; Ready to record |
| System | AutoPTT | Lets user talk w/o manual PTT |
| User | Utterance | Says "Mom" |
| System | Feedback | Plays .wav of "Mom" |
| System | Disables #2 | Shows that pass #2 remains |
| System | GUI Dialogue | "Voice tag created" |

Word Trainer is a control, such as an ActiveX control, that a developer can include in an application for the purpose of initiating and managing a training user interface process. All of the interfaces exposed by the Word Trainer API (MICROSOFT CORP.)

Table 6 identifies word trainer control 158 properties. It is noted that these properties are in addition to Word Trainer API (MICROSOFT CORP.) properties and methods wrapped by the word trainer control 158.

TABLE 6

| PROPERTY | TYPE |
|---|---|
| Type | Enumeration |
| Interrupting | Boolean |

TABLE 6-continued

| PROPERTY | TYPE |
|---|---|
| Feedback | Enumeration |
| PassesRemaining | Integer |

Word Trainer Control Properties

The word trainer control 158 supports the Type property that can be used to determine the behavioral or content characteristics of the control. It is noted that it is the Type property that ultimately determines the style class and properties used in defining the control's behavior. The Type property's valid values are defined in the system's current speech theme.

The Interrupting property determines whether the control will interrupt other interactions in the interaction list 168 of the interaction manager 160. If the Interrupting property has a value of "True," then the control immediately interrupts any other interaction in the interaction list 168. If the value is "False," then the control does not interrupt, but places interactions at the end of the interaction list 168.

The Feedback property determines if the word trainer control 158 will play feedback automatically after the system successfully records the user. If the Feedback property has no value (or a value of 'none'), then the word trainer control 158 doesn't play feedback when the user makes a choice. If the Feedback property has a value of "Earcon," then the word trainer control 158 plays a completion earcon resource after a successful recording. If the value is "Echo recording," then the word trainer control 158 plays a sound file of the user's recording.

The PassesRemaining property is a read-only property that tells an application how many recording passes the engine requires before a usable voice tag exists. It is intended that, as this number decrements, the application user interface reflects course progress through the training process.

In addition to the foregoing, the word trainer control 158 includes a StartRecording method. The StartRecording method initiates the recording process for one pass. When recording completes successfully, the PassesRemaining property decrements. It is noted that, in the cases where the speech engine can accept additional recordings, an application may call StartRecording even though PassesRemaining equals zero.

It is noted that other speech recognition grammars must be temporarily disabled when the speech engine is in a recording mode.

Exemplary Computer Environment

Figure 9:
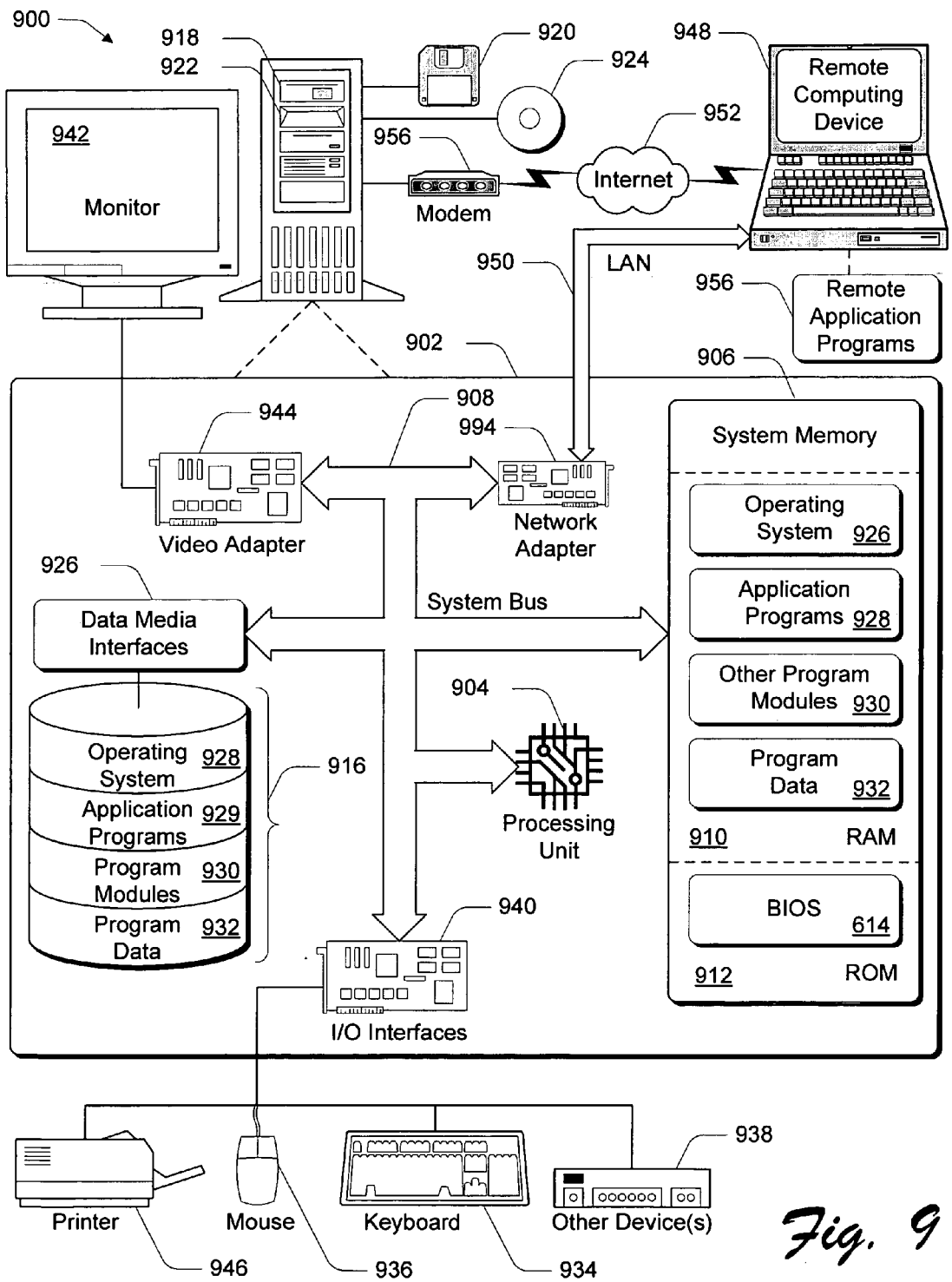
FIG. 9 is a diagram of an exemplary computing environment within which the present invention may be implemented.

The various components and functionality described herein are implemented with a number of individual computers. FIG. 9 shows components of typical example of such a computer, referred by to reference numeral 900. The components shown in FIG. 9 are only examples, and are not intended to suggest any limitation as to the scope of the functionality of the invention; the invention is not necessarily dependent on the features shown in FIG. 9.

Generally, various different general purpose or special purpose computing system configurations can be used. Examples of well known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 9, the components of computer 900 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 900 typically includes a variety of computer-readable media. Computer-readable media can be any available media that can be accessed by computer 900 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 900, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 900 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface such as interface 950.

The drives and their associated computer storage media discussed above and illustrated in FIG. 9 provide storage of computer-readable instructions, data structures, program modules, and other data for computer 900. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 900 through input devices such as a keyboard 962 and pointing device 961, commonly referred to as a mouse, trackball, or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port, or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer may operate in a networked environment using logical connections to one or more remote computers, such as a remote computer 980. The remote computer 980 may be a personal computer, a server, a router, a network PC, a peer device or other common network node, and typically includes many or all of the elements described above relative to computer 900, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets, and the Internet.

When used in a LAN networking environment, the computer 900 is connected to the LAN 971 through a network interface or adapter 970. When used in a WAN networking environment, the computer 900 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 900, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

CONCLUSION

The systems and methods as described, thus provide a way to manage interactions from multiple applications, even if two or more of the multiple applications use different grammars. Implementation of the systems and methods described herein provide orderly processing of interactions from multiple applications so a user can more easily communicate with the applications.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method for processing speech interactions from multiple speech-enabled applications, comprising:
    receiving an interaction submitted by a speech-enabled application;
    determining if the interaction is an interrupting interaction;
    placing the interaction in an interaction list having a front and a back and containing from one to several interactions to be processed in order from the front to the back, wherein the interaction is placed at the back of the interaction list unless the interaction is an interrupting interaction, in which case the interaction is placed at the front of the interaction list; and
    interrupting an interaction currently processing when the interrupting interaction is placed at the front of the list, and the interrupted interaction does not resume processing after the interrupting interaction is processed if a self-destruct flag is set in the interrupted interaction.

2. The method as recited in claim 1, wherein the interaction list is a list of pointers to memory locations that contain the interactions submitted by one of the speech-enabled applications to the interaction list.

3. The method as recited in claim 1, further comprising sending one or more status messages to the application that submitted the interrupted interaction of the status of the processing of the submitted interaction.

4. The method as recited in claim 3, wherein the one or more status messages sent to the application that submitted the interrupted interaction further comprises one or more of the following messages: interaction activated; interaction interrupted; interaction self-destructed; interaction re-activated; and/or interaction completed.

5. The method as recited in claim 1, wherein the determining if the interaction is an interrupting interaction further comprises checking for a presence of an interruption flag in the interaction that, if present, indicates that the interaction is an interrupting interaction.

6. The method as recited in claim 1, wherein the interrupted interaction is a first interaction and the method further comprising waiting a pre-determined grace period after the first interaction is processed before beginning processing of a second interaction submitted from a different speech-enabled application than the speech-enabled application that submitted the first interaction.

7. The method as recited in claim 6, further comprising:
    receiving a third interaction during the grace period, the third interaction being submitted from the speech-enabled application that submitted the first interaction; and
    processing the third interaction prior to processing the second interaction.

8. method for processing speech interactions from multiple speech-enabled applications, comprising:
    receiving an interaction submitted by a speech-enabled application;
    determining if the interaction is an interrupting interaction;
    placing the interaction in an interaction list having a front and a back and containing from one to several interactions to be processed in order from the front to the back,
    placing an interaction received from a speech-enabled application at the end of the interaction list unless an interaction manager detects an indication to place the interaction received from the speech-enabled application at the front of the interaction list ahead of other interactions in the interaction list;
    providing a pre-determined grace period after processing a first interaction submitted by one of the speech-enabled applications before beginning to process a second interaction; and
    placing a chained interaction at the front of the interaction list if the chained interaction is received during the pre-determined grace period after processing the first interaction and if the chained interaction is submitted by the same speech-enabled application that submitted the first interaction, even if the chained interaction does not indicate that it is to be placed at the front of the list and the chained interaction is submitted after the second interaction is submitted.

9. The method as recited in claim 8, wherein the interaction list is a list of pointers to memory locations that contain the interactions submitted by the speech-enabled applications to the interaction list.

10. The method as recited in claim 8, further comprising sending one or more status messages to the speech-enabled application that submitted the interaction of the status of the processing of the submitted interaction.

11. The method as recited in claim 10, wherein the one or more status messages sent to the speech-enabled application that submitted the interaction further comprises one or more of the following messages: interaction activated; interaction interrupted; interaction self-destructed; interaction re-activated; and/or interaction completed.

12. The method as recited in claim 8, wherein the determining if the interaction is an interrupting interaction further comprises checking for a presence of an interruption flag in the interaction that, if present, indicates that the interaction is an interrupting interaction.

13. The method as recited in claim 8, wherein the receiving interaction is a first interaction that is active and the method further comprising waiting a pre-determined grace period after the first interaction is processed before beginning processing of a second interaction submitted from a different speech-enabled application than the speech-enabled application that submitted the first interaction.

14. The method as recited in claim 13, further comprising:
receiving a third interaction during the grace period, the third interaction being submitted from the speech-enabled application that submitted the first interaction; and
processing the third interaction prior to processing the second interaction.

15. A computer readable medium containing instructions that when executed by a computing device, perform actions, including:
receiving an interaction submitted by a speech-enabled application;
determining if the interaction is an interrupting interaction;
placing the interaction in an interaction list having a front and a back and containing from one to several interactions to be processed in order from the front to the back, wherein the interaction is placed at the back of the interaction list unless the interaction is an interrupting interaction, in which case the interaction is placed at the front of the interaction list; and
interrupting an interaction currently processing when the interaction is placed at the front of the list, and the interrupted interaction does not resume processing after the interrupting interaction is processed if a self destruct flag is set in the interrupted interaction.

16. The computer readable medium as recited in claim 15, wherein the interaction list is a list of pointers to memory locations that contain the interactions submitted by one of the speech-enabled applications to the interaction list.

17. The computer readable medium as recited in claim 15, further comprising instructions for sending one or more status messages to the application that submitted the interrupted interaction of the status of the processing of the submitted interaction.

18. The computer readable medium as recited in claim 17, wherein the one or more status messages sent to the application that submitted the interrupted interaction further comprises one or more of the following messages: interaction activated; interaction interrupted; interaction self-destructed; interaction re-activated; and/or interaction completed.

19. The computer readable medium as recited in claim 15, wherein the determining if the interaction is an interrupting interaction further comprises checking for a presence of an interruption flag in the interaction that, if present, indicates that the interaction is an interrupting interaction.

20. The computer readable medium as recited in claim 15, wherein the receiving interaction is a first interaction and the instructions further comprise instructions for waiting a pre-determined grace period after the first interaction is processed before beginning processing of a second interaction submitted from a different speech-enabled application than the speech-enabled application that submitted the first interaction.

* * * * *